(12) United States Patent
Morita et al.

(10) Patent No.: US 11,721,092 B2
(45) Date of Patent: Aug. 8, 2023

(54) EVENT ANALYSIS SYSTEM AND EVENT ANALYSIS METHOD

(71) Applicant: HITACHI, LTD., Tokyo (JP)

(72) Inventors: Kenichi Morita, Tokyo (JP); Yoshiki Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 218 days.

(21) Appl. No.: 17/200,135

(22) Filed: Mar. 12, 2021

(65) Prior Publication Data

US 2021/0326596 A1    Oct. 21, 2021

(30) Foreign Application Priority Data

Apr. 21, 2020 (JP) ................. 2020-075448

(51) Int. Cl.
| | | |
|---|---|---|
| *G06V 10/82* | (2022.01) | |
| *G06V 20/40* | (2022.01) | |
| *G06V 20/64* | (2022.01) | |
| *G06F 18/2113* | (2023.01) | |
| *G06V 10/764* | (2022.01) | |

(Continued)

(52) U.S. Cl.
CPC .......... *G06V 10/82* (2022.01); *G06F 18/2113* (2023.01); *G06V 10/764* (2022.01); *G06V 20/41* (2022.01); *G06V 20/46* (2022.01); *G06V 20/52* (2022.01); *G06V 20/64* (2022.01); *G06V 40/103* (2022.01); *G06V 20/44* (2022.01)

(58) Field of Classification Search
CPC ........ G06V 20/41; G06V 20/46; G06V 20/64; G06V 20/44; G06V 10/764; G06V 10/82; G06V 20/52; G06V 40/103; G06K 9/623; H04N 7/181
See application file for complete search history.

(56) References Cited

U.S. PATENT DOCUMENTS

| | | | |
|---|---|---|---|
| 6,028,626 A | 2/2000 | Aviv | |
| 10,169,665 B1 * | 1/2019 | Zhang | ................. G06T 7/80 |
| 11,023,730 B1 * | 6/2021 | Zhou | ................. G06N 3/08 |

(Continued)

FOREIGN PATENT DOCUMENTS

| | | |
|---|---|---|
| JP | 2019-050438 A | 3/2019 |
| JP | 2019-106631 A | 6/2019 |

OTHER PUBLICATIONS

Partial European Search Report issued on Sep. 3, 2021 for European Patent Application No. 21162505.8.

(Continued)

*Primary Examiner* — Santiago Garcia
(74) *Attorney, Agent, or Firm* — Volpe Koenig

(57) ABSTRACT

An event analysis system capable of appropriately estimating a specific event is provided. Provided are an estimation unit that estimates a track of a person based on video data acquired by a camera, a determination unit that determines, based on determination information for determining a specific event, whether or not the track estimated by the estimation unit corresponds to the specific event, a filter unit that removes, based on normal event information for identifying a normal event, the normal event from the events that have been determined by the determination unit to correspond to the specific event, and an output unit that outputs information indicating that the event is occurring after the normal event has been removed by the filter unit.

8 Claims, 14 Drawing Sheets

(51) Int. Cl.
*G06V 20/52* (2022.01)
*G06V 40/10* (2022.01)

(56) References Cited

U.S. PATENT DOCUMENTS

| | | | | |
|---|---|---|---|---|
| 2018/0341813 | A1* | 11/2018 | Chen | G06V 20/46 |
| 2019/0034734 | A1* | 1/2019 | Yen | G06F 18/2413 |
| 2019/0130188 | A1* | 5/2019 | Zhou | G06T 7/248 |
| 2019/0130189 | A1* | 5/2019 | Zhou | G06V 10/7515 |
| 2019/0228564 | A1* | 7/2019 | Tan | G06T 19/00 |
| 2019/0304102 | A1* | 10/2019 | Chen | G06N 20/00 |
| 2019/0306408 | A1* | 10/2019 | Hofer | H04N 23/90 |
| 2020/0098085 | A1* | 3/2020 | Blott | G06V 40/10 |
| 2021/0365707 | A1* | 11/2021 | Mao | H04N 23/45 |
| 2022/0005332 | A1* | 1/2022 | Metzler | G08B 13/1968 |

OTHER PUBLICATIONS

Zhu et al., Detection and Recognition of Abnormal Running Behavior in Surveillance Video, Mathematical Problems in Engineering, pp. 1-14, ISSN: 1024-123X, DOI: 10.1155/2012/296407, 2012.
Chaudhary et al., Multiple Anomalous Activity Detection in Videos, Procedia Computer Science, vol. 125, pp. 336-345, ISSN: 1877-0509, DOI: 10.1016/j.procs.2017.12.045, Dec. 7, 2017.
Singapore Search Report & Written Opinion dated Jul. 24, 2022 for Singapore Patent Application No. 10202102594V.

* cited by examiner

FIG. 3

| ID | TYPE | CONTENT | CAMERA ID |
|---|---|---|---|
| 001 | TIME | 2020/04/01 11:00:00 → 2020/04/01 11:15:00 | ALL |
| 002 | FACE IMAGE | IMAGE DATA (CELEBRITY FACE IMAGE DATA) | C0011 |
| 003 | ACTION | VIDEO DATA (MUSICAL INSTRUMENT PERFORMANCE SCENE) | C0032 |
| 004 | ACTION | VIDEO DATA (PLURALITY OF PEOPLE PERFORMING SCENE) | C0041, C0043 |
| 005 | WHOLE BODY IMAGE | IMAGE DATA (COSTUMED CHARACTER IMAGE DATA) | ALL |
| 006 | EQUIPMENT | IMAGE DATA (MOBILE STORE IMAGE) | C0001, C0002 |
| 007 | EQUIPMENT OPERATING STATE | VIDEO DATA (OPERATING SCENE OF STAGE DEVICE) | C0200 |
| 008 | GAZE STATE | IDENTIFICATION VALUE (DIGITAL SIGNAGE REVIEW) | C0141 |
| 009 | EQUIPMENT | IMAGE DATA (IMAGE DATA OF CHAIR, TABLE, ETC.) | ALL |
| ... | | | |
| | | | |

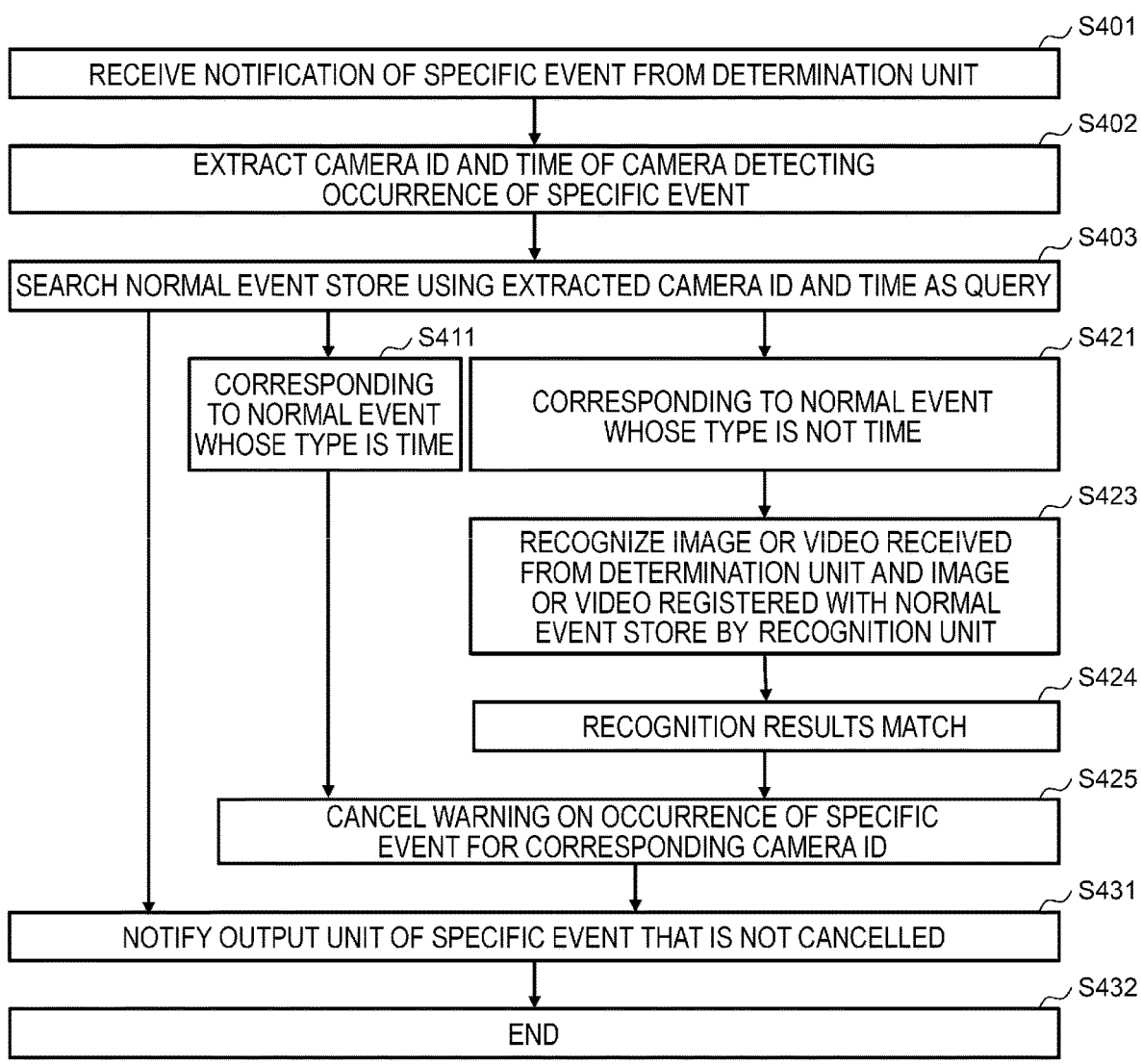

FIG. 12
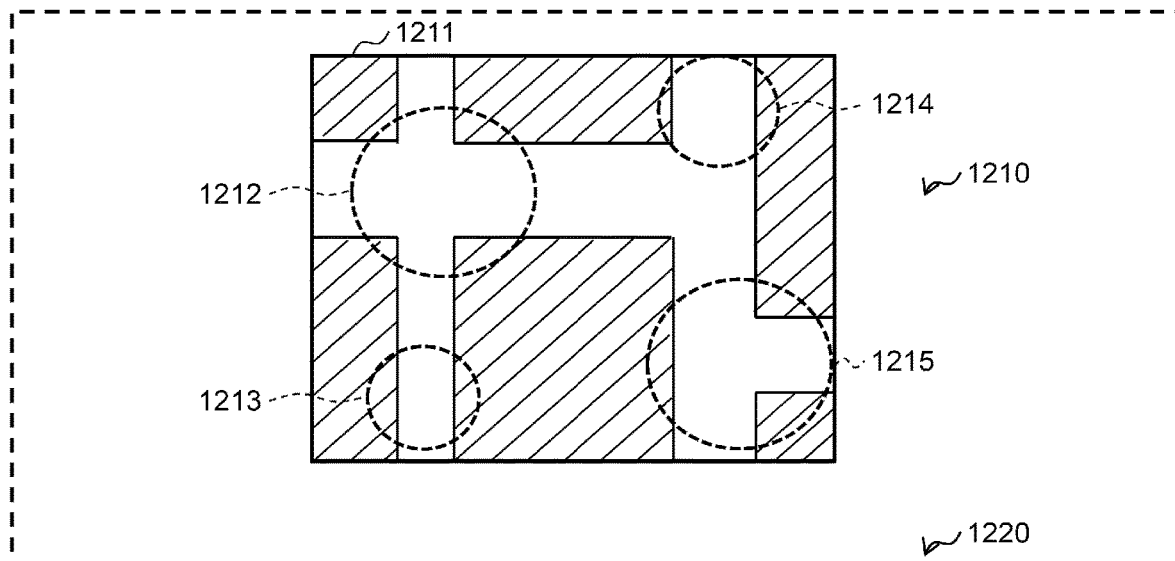
| AREA ID | PATH CONNECTION AREA: DISTANCE |
|---|---|
| 1212 | 1213:10m, 1214:15m, 1215:22m |
| 1213 | 1212:10m |
| 1214 | 1212:15m, 1215:7m |
| 1215 | 1214:7m, 1212:22m |
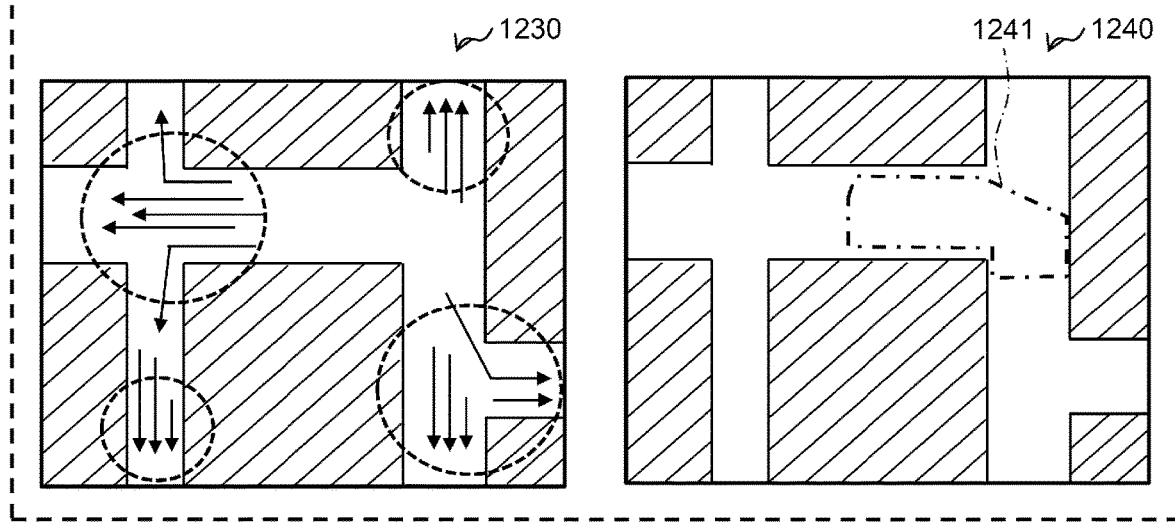

EVENT ANALYSIS SYSTEM AND EVENT ANALYSIS METHOD

BACKGROUND OF THE INVENTION

1. Field of the Invention

The present invention generally relates to the analysis of events.

2. Description of Related Art

Video surveillance systems are installed in most cases in order to find out whether a specific event (hereinafter referred to as "specific event") such as a terrorist act or a criminal act is occurring or not at a facility (hereinafter referred to as a "facility") where various people are expected to come and go.

In recent years, there has been a demand for a video surveillance system that responds to the replacement or support for the monitoring person by providing a video analysis function in addition to a conventional function of a monitor display function and a recording function of the video captured by a surveillance camera.

An example of the video analysis function includes an entrance detection function, a left-behind baggage detection function, a detection function of various human actions such as a fall, an altercation, and the like. In this way, a recognition method premised on the assumption of actions of an individual person, states of an object, and the like has an advantage of high recognition accuracy because a learning-based or rule-based recognition technique such as so-called machine learning can be applied.

However, the specific event may include an event that is difficult to assume in the present situation, and it is difficult to comprehensively recognize the specific event by a recognition technique premised on learning or a recognition technique premised on building of rules.

As one of the solutions to such a problem, a method of indirectly detecting the occurrence of a specific event by analyzing states like locations of people and tracks of people, such as dispersion (evacuation), gathering, and the like of a plurality of people in the facility is considered. Such a method has a difficulty in recognizing the nature of the specific event (that is, what type of specific event is occurring), but has an advantage of discovering the occurrence of the specific event that is difficult to assume in advance. In particular, in a situation where a plurality of people are being evacuated, the possibility of receiving a notification from the site becomes low so that it is considered to be significant for a person in charge of management, operation, security, and the like of the facility to be able to immediately notice the occurrence of the specific event even without knowing the nature of the specific event.

A technique for video surveillance that utilizes "gathering" and "dispersion" which are one of the tracks of a plurality of people is disclosed in JP-A-2019-50438 and JP-A-2019-106631. JP-A-2019-50438 describes a technique of detecting a specific suspicious person by recognizing people in a capturing range for each gathered group and detecting a case where the group moves fast and a case where the group is dispersed all at once. Further, JP-A-2019-106631 describes a technique of detecting a suspicious person by a method of recognizing people in a capturing range for each group and detecting a baggage delivery action when a person deviating from the group performs the baggage delivery action.

At a facility where various people are expected to come and go, in addition to events prepared by the facility, activities such as the traffic of celebrities, mascot characters, and the like and showing of street performances by passers-by, which do not correspond to highly urgent specific events, can sometimes affect the tracks of the people at the facility (for example, gathering, dispersion, detour, stay, and the like may occur).

In this way, when activities that do not correspond to the specific events are performed and the gathering, dispersion, and the like occur, it is not possible to appropriately detect the specific event by the technique preparing in advance for an abnormal track pattern in the gathering, dispersion, and the like disclosed in JP-A-2019-50438 and JP-A-2019-106631.

SUMMARY OF THE INVENTION

The present invention is made in consideration of the above problems and an object thereof is to propose an event analysis system or the like capable of estimating a specific event more appropriately.

In order to solve such a problem, the present invention is provided with an estimation unit that estimates a track of a person based on video data acquired by the camera, a determination unit that determines, based on determination information for determining a specific event, whether or not the track estimated by the estimation unit corresponds to the specific event, a filter unit that removes, based on normal event information for identifying a normal event, the normal event from the event that is determined by the determination unit to correspond to the specific event, and an output unit that outputs information indicating that an event is occurring after the normal event has been removed by the filter unit.

In the above configuration, the occurrence of an abnormal event, which is not a normal event, is output so that a person in charge can easily find out the abnormal event, for example. According to the above configuration, for example, it is possible to suppress false detection of the normal event such as a normal gathering of people, normal dispersion of people, and so on, and reduce unnecessary check and response by the person in charge, so that the person in charge can efficiently perform the job.

According to the present invention, a highly reliable event analysis system can be realized.

BRIEF DESCRIPTION OF THE DRAWINGS

FIG. 3 is a diagram showing an example of data relating to a normal event according to the first embodiment;

FIG. 4 is a diagram showing an example of processing according to the first embodiment;

FIG. 12 is a diagram for illustrating a relationship among a camera area, a moving path of a person, and an abnormal area according to the third embodiment;

DESCRIPTION OF EMBODIMENTS

(1) First Embodiment

Figure 1:
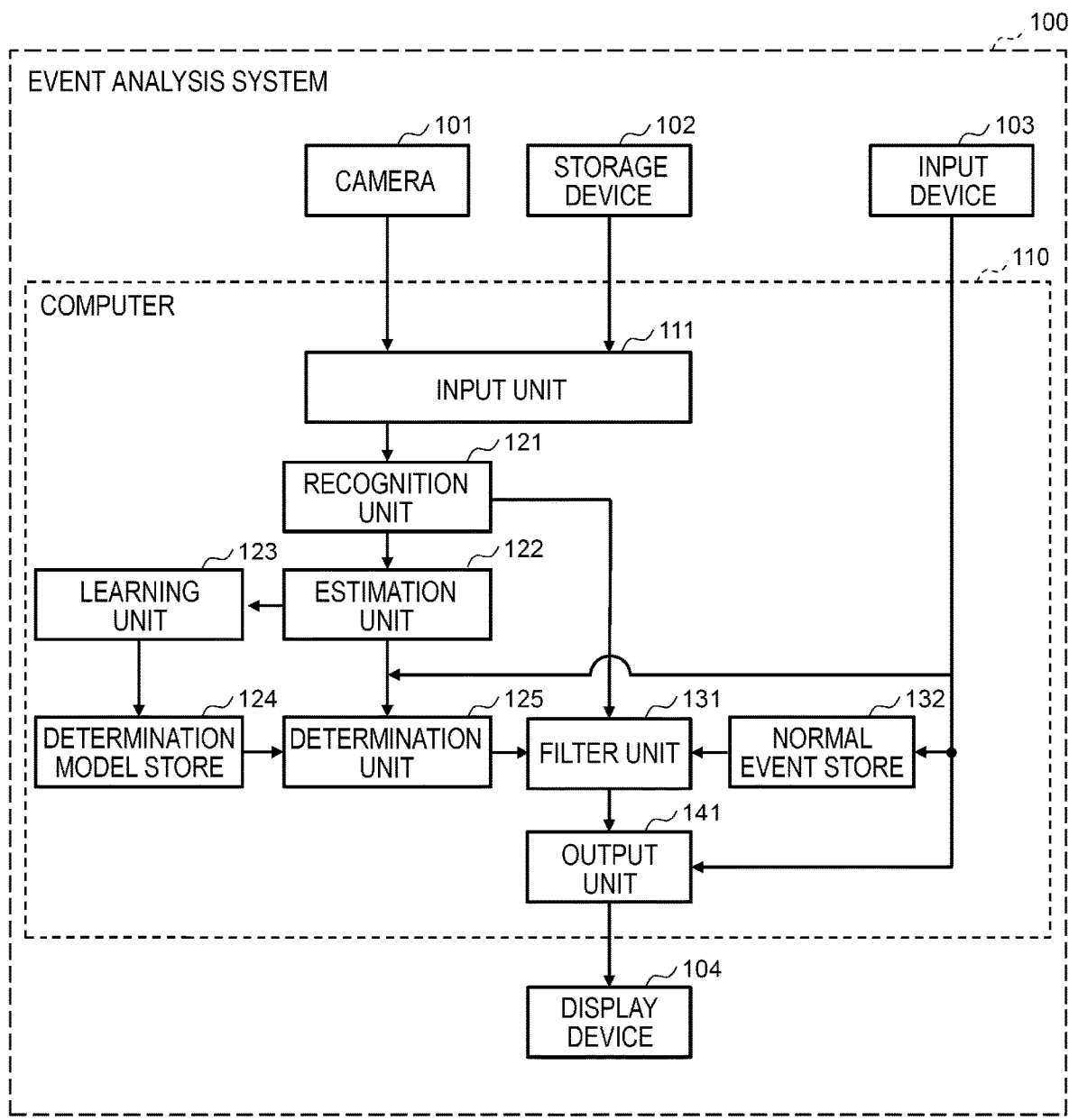
FIG. 1 is a diagram showing an example of a configuration relating to an event analysis system according to a first embodiment.

Hereinbelow, an embodiment of the present invention will be described in detail. The present embodiment describes an analysis of a specific event. The specific event refers to a wide range of events such as a terrorist act, a criminal act, trouble among facility users, a situation where a facility user needs the support of others (for example, an emergency patient), and the like. The facility refers to, for example, a facility with a large total floor area and a facility where heavy traffic of people is expected. More specifically, the facility refers to an airport, a railroad station, a harbor, a commercial facility, a convention venue, a sports venue, an amusement facility, and the like.

The event analysis system according to the present embodiment analyzes the tracks of a plurality of people who pass the area (a capturing range of a camera, hereinafter referred to as "camera area") surveillanced by a camera based on the ordinary tracks of people and recognizes the occurrence of the specific event.

The above configuration enables analysis of a discrepancy between the tracks of a plurality of people passing the camera area and the ordinary tracks, thus enabling the detection of the specific event even in a case other than a special case such as extreme gathering and dispersion (evacuation).

Further, in the normal events (hereinafter referred to as "normal event") such as cases where a plurality of people simultaneously run to meet flight time, departure time, appointment time, and the like, cases where children run around for a play, hang around chairs and desks, and stop to watch digital signage and street performances, and the like, the tracks are different from the ordinary tracks but they do not correspond to the specific event. The normal event includes a person, a group of people, a general object other than a person, such as a machine, and movements thereof.

In this regard, when it is confirmed that the tracks are different from the normal tracks, the event analysis system checks whether or not the abnormality of the tracks is induced by the normal event. In this way, the event analysis system can refrain from notifying the specific event when the normal event is maintained and the change of track state from the normal state poses no problem.

Further, even if the specific event is detected by the techniques described in JP-A-2019-50438 and JP-A-2019-106631, there is a problem that it is difficult to find out where the specific event is occurring in the camera area.

In this regard, with the event analysis system, it is possible to estimate the area where the specific event has occurred in the capturing range of the camera based on the tracks of a plurality of people, for example. In addition, the present invention is made in consideration of the above points and proposes an event analysis system, or the like capable of estimating an area where the specific event has occurred.

Further, there may be a highly urgent specific event that occurs in a blind spot of the camera area and the specific event appears to affect the tracks of a plurality of people appearing in the camera area around the spot. In such a case, there is a problem that, although an abnormality is perceived from the tracks of a plurality of people in the video of the corresponding camera, the specific event is not found in the video or image even when the video or image of the camera is checked.

In order to deal with such a problem, it is necessary to find out the situation in which the specific event occurs with a plurality of cameras installed in the facility, and estimate a location (this may be a predetermined range including the location, and will be hereinafter referred to as an "abnormal area") where the specific event has occurred outside the camera area based on the tracks of a plurality of people in the plurality of cameras.

In this respect, even when the specific event is occurring in the blind spot of the camera area, it is possible to estimate the abnormal area by analyzing the track states in a plurality of cameras in the event analysis system.

Next, the embodiment of the present invention will be described with reference to the drawings. However, the present invention is not limited to the embodiment.

In FIG. 1, a reference numeral 100 indicates an event analysis system according to the first embodiment as a whole.

FIG. 1 is a diagram showing an example of a configuration according to the event analysis system 100.

The event analysis system 100 includes a camera 101, a storage device 102, an input device 103, a display device 104, and a computer 110.

The camera 101 is a capturing device that captures a person or the like to generate video data and outputs the generated video data. The camera 101 may be a video camera, a still camera, a high-sensitivity camera, a low-light camera, a night-vision camera, a thermal camera, an X-ray camera, or the like, or may include a plurality of cameras including any of these. That is, the camera 101 may be a device including at least one camera (for example, the one camera itself).

The storage device 102 is a storage device storing video data and outputting the stored video data as requested. The storage device 102 may be a hard disk drive, a solid state drive (SSD), or the like embedded in a computer. Further, the storage device 102 may be configured by using a storage system connected via a network, such as a network attached storage (NAS), a storage area network (SAN), a recorder for a surveillance camera, and the like.

The video data output from the camera 101 or the storage device 102 is all inputted to an input unit 111 of the computer 110. The event analysis system 100 may include both the camera 101 and the storage device 102 as shown in FIG. 1 but may include only one of them. When the event analysis system 100 includes both the camera 101 and the storage device 102, an input source of the video data to the input unit 111 may be switched to the camera 101 or the storage device 102 as needed. Further, the video data output from the camera 101 may be temporarily stored in the storage device 102 and then inputted to the input unit 111 therefrom. In that case, the storage device 102 may be, for example, a cache memory that temporarily retains video data continuously inputted from the camera 101.

In addition, the video data stored in the storage device 102 and the video data generated by the camera 101 may be data in any format. For example, the camera 101 may be a video camera, and the moving image data captured by the camera 101 may be output as the video data, or such video data may be stored in the storage device 102. Further, the camera 101 may be a still camera, and a series of still image data captured at predetermined intervals (intervals that allow tracking of at least the captured object) may be output as the video data, or such video data may be stored in the storage device 102.

The input device 103 is an input interface for transmitting a user's operation to the computer 110, such as a mouse, a keyboard, a touch device, a voice recognition device, and the like. The display device 104 is an output interface such as a liquid crystal display, and the like, and is used for the display of the image analysis result of the computer 110, the interactive operation with a user, and the like. The input device 103 and the display device 104 may be integrated by using a so-called touch panel or the like.

The computer 110 is an example of an event analysis device. The computer 110 is a personal computer, a server machine, a virtual machine on a cloud, or the like.

The computer 110 estimates a track of a person in a video and determines whether or not a specific event is occurring in or near the camera area of the camera 101 based on the tracks of a plurality of people appearing in the video. Further, the computer 110 performs filter processing to confirm whether or not a specific event candidate determined to be occurring corresponds to the normal event, and outputs the occurrence of the specific event when it is confirmed as a result that the specific event is occurring.

The video handled by the computer 110 may be a video of fixed-point observation captured at one or more places or may be a video captured by the camera 101 installed on a moving object such as an in-vehicle camera, a drone-mounted camera, a wearable camera, an action camera, or the like.

The computer 110 includes the input unit 111, a recognition unit 121, an estimation unit 122, a learning unit 123, a determination model store 124, a determination unit 125, a filter unit 131, a normal event store 132, and an output unit 141.

The input unit 111 receives from the camera 101 the video data captured by the camera 101 or reads the video data from the storage device 102 and converts the video data into a data format used inside the computer 110. For example, the input unit 111 performs moving image decode processing that decomposes a moving image (a moving image data format) into a plurality of time-series frames (a still image data format). The frame obtained by the moving image decode processing is sent to the recognition unit 121.

In addition, when the input unit 111 receives the input of the camera 101 including the plurality of cameras 101, the frames are sent to the recognition unit 121 along with the correspondence information of the cameras 101. Regarding the subsequent processing of the input unit 111, for the different cameras 101, the same processing is performed for each of the cameras 101. An example where the camera 101 includes a single camera 101 will be described below.

The estimation unit 122 estimates the track of each person in the frames based on a result of person recognition in a plurality of time-series frames for each camera received from the recognition unit 121. Any technique may be used for the track estimation.

For example, the estimation unit 122 may acquire a location of the same person at each time by matching the same person appearing in a plurality of time-series frames based on the similarity degree of the image features of each person and estimate the track of each person. Further, for example, the estimation unit 122 may estimate the track by a deep learning-based person tracking model. An example of an available deep learning-based person tracking model includes "Deep SORT" (Nicolai Wojke, Alex Bewley, Dietrich Paulus, "SIMPLE ONLINE AND REALTIME TRACKING WITH A DEEP ASSOCIATION METRIC", arXiv: 1703.07402v1, 2017).

Further, the estimation unit 122 may receive the time-series frames from the input unit 111 without going through the recognition unit 121 and directly estimate the track by utilizing the changes in the pixel values without individual object recognition. For example, the estimation unit 122 may apply an estimation technique of motion features by pixel changes, such as "optical flow", and estimate the track of each person.

The learning unit 123 learns the track of a person received from the estimation unit 122. The track learning may be done by any method as long as the determination unit 125 learns information which can be used as the information for determining whether or not the track received from the estimation unit 122 is different from the ordinary track.

For example, the learning unit 123 may learn the statistical values (mean, maximum, minimum, variance, and the like) relating to a route (hereinafter referred to as "traffic route") of a person when he or she moves, speed for each traffic route, population density for each traffic route, traffic frequency for each traffic route, and the like, and the tendency of these according to time.

Further, the learning unit 123 may learn by accumulating the feature amounts acquired by using a feature amount extractor utilizing machine learning such as deep learning. For example, the learning unit 123 may learn by a method of performing learning with regard to track data by the autoencoder (self-encoder) technique, acquiring the intermediate layer data of the autoencoder as the feature amount, and accumulating the same according to time. Further, the learning unit 123 may gather and input a plurality of track data into the autoencoder, acquire the feature amounts indicating a plurality of track states from the intermediate layer data of the autoencoder, and accumulate the same.

The determination model store 124 may receive and retain a determination model relating to the track of a person learned by the learning unit 123 or may retain in advance a determination model indicating the track states of a plurality of people corresponding to the ordinary state and the abnormal state. When the determination model is retained in advance, the determination model may be set at the time of construction of the event analysis system 100, or a user may use the input device 103 to set the determination model when using the event analysis system 100.

The determination unit 125 estimates an occurrence of the specific event by determining whether or not the movements of a plurality of people different from the ordinary movements are occurring in the tracks of a plurality of people received from the estimation unit 122, based on the determination model retained in the determination model store 124.

More specifically, the determination unit 125 processes the track data of a plurality of people received from the estimation unit 122 so as to compare the track data with the determination model retained in the determination model store 124. For example, the determination unit 125 acquires the feature amount such as the traffic route, the speed for each traffic route, and the like based on the track data, or acquires the feature amount by the autoencoder technique used by the learning unit 123 and then compares the feature amount with the determination model retained in the determination model store 124. When the feature amount corresponding to the track received from the estimation unit 122 is different from the feature amount received from the determination model store 124, the determination unit 125 determines that there is a possibility of the specific event occurring in the video. At this time, the determination unit 125 may determine whether or not the feature amounts are different by using a feature amount distance.

The effect obtainable by the above configuration will be described below.

In a facility where various people are expected to come and go, for example, at ordinary times, there may be gathering at the meeting places or hanging around at or near chairs, desks, and shops, or changes in moving speed caused by escalators, staircases, moving walks, and changes in the inclination angle of road surfaces, or stopping to watch advertisements or digital signage, or children running around, or detouring caused by dirt, damage, temporary construction of the facility, and the like.

Therefore, it is not considered easy to estimate the occurrence of the specific event from the track without having information on the track of a plurality of people at ordinary times. However, with the method of the event analysis system 100 of learning the tracks at ordinary times and detecting a difference from the ordinary times, it is possible to improve the estimation accuracy of a specific event. Further, for example, the event analysis system 100 can respond to temporal changes in the environment, such as people starting to detour because the road surface becomes dirty with a suspicious object.

Of course, when an obvious abnormality occurs, such as when almost everyone in the camera area begins to run at the same time to be dispersed (evacuated), the event analysis system 100 may estimate the specific event by the determination model store 124 which retains in advance a rule to handle such a special case as a determination model.

The filter unit 131 receives a frame that serves as a specific event candidate from the determination unit 125, and further, receives a result of object recognition of the frame from the recognition unit 121, receives a normal event model from the normal event store 132, and then determines whether or not the specific event candidate corresponds to the normal event. More specifically, the normal event store 132 retains, as the normal event, image information of a first target allowed to affect the movement of a nearby person, image information of a second target allowed to make a special movement in the camera 101, and the place and time of the first target and the second target showing up, and the like. The first target includes a mascot character, a member giving a performance, a member in a parade, a celebrity, and the like. The second target includes a security guard, a construction worker, store staff, a police officer, and the like.

The filter unit 131 checks whether or not it corresponds to the normal event based on the result of object recognition corresponding to the frame and determines that the frame received from the determination unit 125 does not correspond to the specific event when it is determined that it corresponds to the normal event.

As a result, the determination result of corresponding to the specific event is notified to the output unit 141. In addition, the event, which was estimated by the determination unit 125 to be a specific event candidate but has been filtered out by the filter unit 131 for not corresponding to the specific event, may be notified as an event (notification event) with lower urgency than the specific event.

As described above, with the configuration including the filter unit 131, the event analysis system 100 can determine that the following cases do not correspond to the specific event even when the occurrence of the specific event is estimated based on the tracks of a plurality of people. An example includes gathering and running for approaching of the audience caused by the first target such as the mascot character, the movement and dispersion (evacuation) of the audience following the movement of this target, and the movement by the second target such as the security guard distinct from the movement of the other passers-by. Further, another example is a case where the appearance of the target allowed to affect the movement of the people is known in advance and the appearance occurs in the camera 101 near the location of its appearance within the scheduled time. As a result, it is possible to reduce the risk of a person in charge receiving a false warning.

The data retained in the normal event store 132 and the processing of the filter unit 131 will be described below with reference to FIGS. 3 and 4.

Figure 2:
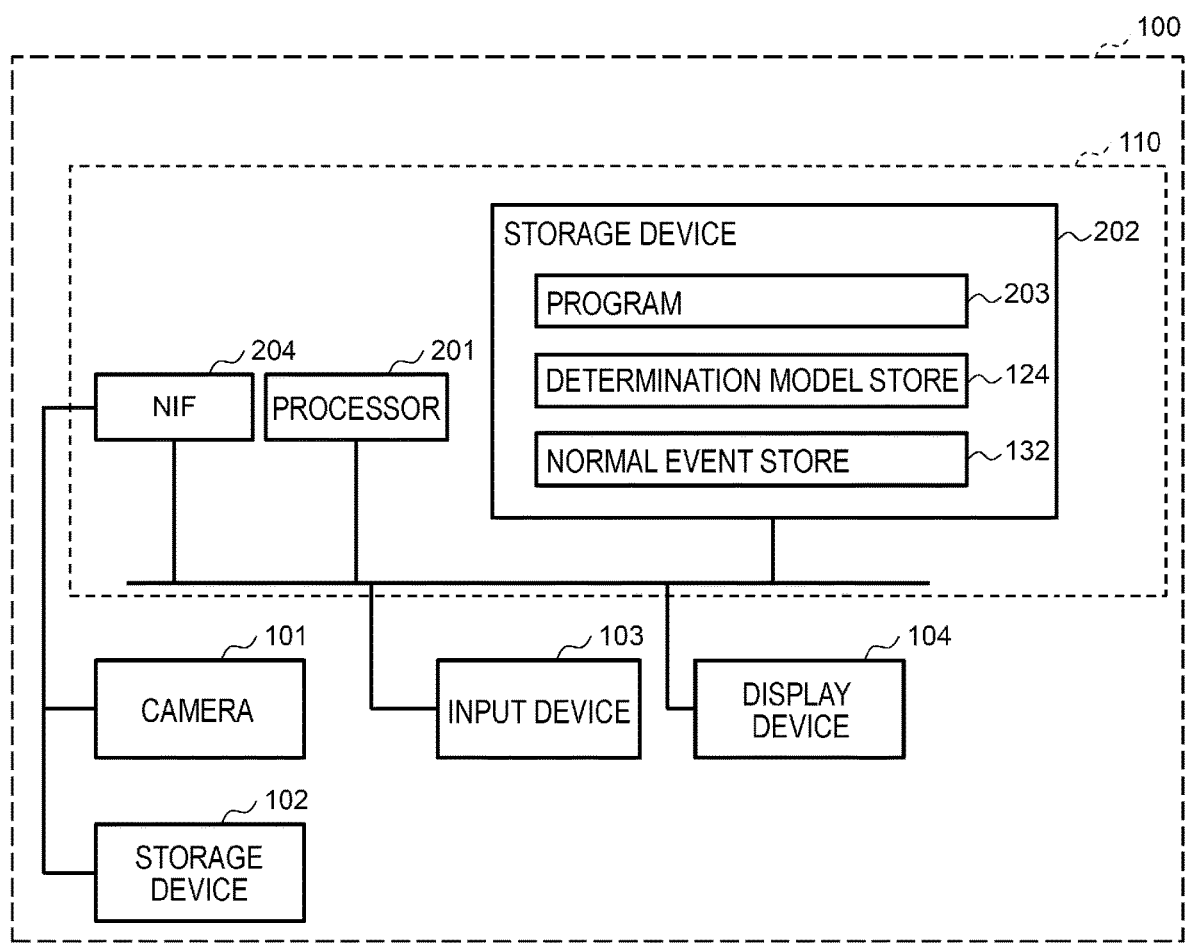
FIG. 2 is a diagram showing an example of a hardware configuration according to the first embodiment.

FIG. 2 is a diagram showing an example of the hardware configuration of the event analysis system 100.

The computer 110 is, for example, a general computer including a processor 201 and a storage device 202 interconnected with each other.

The processor 201 is one or more processor devices. At least one processor device is typically a microprocessor device such as a central processing unit (CPU) but may be a processor device of another type such as a graphics processing unit (GPU). At least one processor device may be single-cored or multi-cored. At least one processor device may be a processor core. At least one processor device may be a processor device in a broad sense, such as a hardware circuit (for example, Field-Programmable Gate Array (FPGA) or Application Specific Integrated Circuit (ASIC)) that performs part or all of the processing.

The storage device 202 may be at least one memory among a memory and a permanent storage device. The memory may be one or more memory devices, and may typically be a main storage device. At least one memory device in the memory may be a volatile memory device or a non-volatile memory device. The permanent storage device is one or more permanent storage devices. The permanent storage device is typically a non-volatile storage device (for example, auxiliary storage devices) and an example includes a hard disk drive (HDD) or a solid state drive (SSD).

The functional units such as the input unit 111, the recognition unit 121, the estimation unit 122, the learning unit 123, the determination unit 125, the filter unit 131, and the output unit 141 shown in FIG. 1 are realized by the processor 201 executing the program 203 stored in the storage device 202. In other words, in this example, the processing executed by each of the above functional units is actually executed by the processor 201 in accordance with the commands described in the program 203.

Further, each of the determination model store 124 and the normal event store 132 may be a storage area included in the storage device 202.

The computer 110 further includes a network interface device (NIF) 204 connected to the processor 201. The NIF 204 may be one or more communication interface devices. The communication interface device may be one or more communication interface devices of the same type (for example, one or more network interface cards (NICs)) or two or more communication interface devices of different types (for example, NIC and a host bus adapter (HBA)).

The camera 101 and the storage device 102 are connected to the computer 110 via the NIF 204, for example.

The input device 103 and the display device 104 may be devices connected to the computer 110 by wired or wireless communication means or may be an integrated device. The input device 103 and the display device 104 may be an input device and a display device included in a client computer connected to the computer 110.

FIG. 3 is a diagram showing an example of data (data table 301) relating to the normal event retained in the normal event store 132. FIG. 3 illustrates a case where the normal event data is retained as the data table 301, but a different data representation format may be employed as long as the retained data has the same content. For example, a class format, a dictionary format, and the like are candidates.

The data table 301 can retain data of a plurality of normal events. The data table 301 retains an ID 302, a type 303, a content 304, and a camera ID 305 for individual normal events.

The ID 302 retains integer values in an ascending order starting from "001". However, the ID 302 only needs to retain data that can identify a plurality of normal events and may retain random numerical values such as hash values, some character strings, or the like. The type 303 retains the types of normal events. The type 303 of the normal event is, for example, "time", "face image", "whole body image", "action", "equipment image", "equipment operating state", "gaze state" and the like. The content 304 is actual data corresponding to the normal event types retained in the type 303.

Here, the data retained in the content 304 for each type 303 will be described. When the type 303 is "time", the data table 301 retains a start time and an end time for applying the filter unit 131. When the type 303 is a "face image", the data table 301 retains face images in the normal event. When the type 303 is a "whole body image", the data table 301 retains whole body images in the normal event.

In addition, the targets whose face images are retained and the targets whose whole body images are retained are people such as athletes, security guards, construction workers, store staff, entertainers of facility events, and the like. In this case, clothes worn on the face and/or the whole body such as a staff's uniform, a worker's helmet, facial masks, and costumes of a professional wrestler and a magician may be retained as face images and/or whole body images. Further, the target of the normal event does not necessarily have to be a human being. For example, the target may be an animal, a robot, a mascot character, or the like.

When the type 303 is "action", the data table 301 retains the video clip data of the scenes in normal events. For example, the data is the video data containing scenes such as playing of musical instruments, dance shows, parades, and the like. When the type 303 is "equipment", the data table 301 retains image data of the appearance, chairs, tables, or the like of a mobile store.

When the type 303 is "equipment operating state", the data table 301 retains video data showing the equipment being operated. For example, the video data is video data of events such as an operating scene of a stage set, fireworks, and the like.

In addition, instead of retaining image data or video data, the content 304 may retain an image feature amount, an identification label, and the like obtainable by recognizing the image data and the video data by the recognition unit 121.

Further, when the type 303 is the "gaze state", the data table 301 retains a gaze state label. The gaze state label is an identification value indicating a state such as, for example, "looking around", "staring", and the like. The gaze state label may be a feature amount obtainable by recognizing a video corresponding to this gaze state label by the recognition unit 121.

The camera ID 305 is an ID of the camera 101 to which the filter according to the respective normal event is applied. The camera ID 305 includes an ID for identifying one or more individual cameras 101. Further, the camera ID 305 may include a character string such as "ALL" indicating that it is applied to all cameras 101, a numerical string corresponding thereto, or the like. When any plurality of cameras 101 are given a camera group ID indicating that they form a group, the camera ID 305 may include the camera group ID.

FIG. 4 is a diagram showing an example of the processing of the filter unit 131.

The filter unit 131 receives a notification of the specific event from the determination unit 125 (step S401). Regarding the specific event received in step S401, the filter unit 131 extracts data including the camera ID of the camera 101 which detected the occurrence of the specific event and the time (step S402).

Next, the filter unit 131 executes a search of the data table 301 retained in the normal event store 132 by using the camera ID and the time as a query (step S403).

When the filter unit 131 determines that there is the specific event corresponding to the data of the normal event whose type 303 is "time" based on the search result in step S403 (step S411), the filter unit 131 cancels a warning against the specific event (step S425).

When the filter unit 131 determines that there is the specific event corresponding to the data of the normal event whose type 303 is not "time" based on the search result in step S403 (step S421), the filter unit 131 executes recognition processing by the recognition unit 121 on the image or the video relating to the specific event and the image or the video retained in the data table 301 (step S423).

When the identification label (identification result) or the feature amount corresponding to the image or the video obtained by the recognition processing in step S423 matches (step S424), the filter unit 131 cancels the warning against the specific event (step S425).

The filter unit 131 notifies the output unit 141 of the specific event that has not been canceled through step S425 (step S431) and ends a series of processing (step S432).

In addition, the processing of step S411 and steps S421 through S424 may be processed in parallel or may be processed sequentially one after another. Further, depending on the operation, any one of step S411 and steps S421 through S424 may be skipped.

Further, in step S423, when the type 303 of the normal event is "action", "equipment operating state", or the like, the recognition unit 121 may separate the video data into frames and execute object recognition in each frame, or alternatively, may receive continuous time-series frames and extract a motion feature amount, or may perform recognition processing on actions, motions, or the like. Further, when the type 303 of the normal event is "gaze state" or the like, the recognition unit 121 executes the recognition processing of the gaze state of the person appearing in the image. Further, the recognition unit 121 may determine whether or not the gazes of a plurality of people are focused and perform the recognition processing on an object at the position where the gazes are focused. By such recognition processing, it is possible to recognize that the target that a plurality of people are looking at is, for example, an advertisement, digital signage, or the like, and it can be understood that it does not correspond to the specific event.

Figure 5:
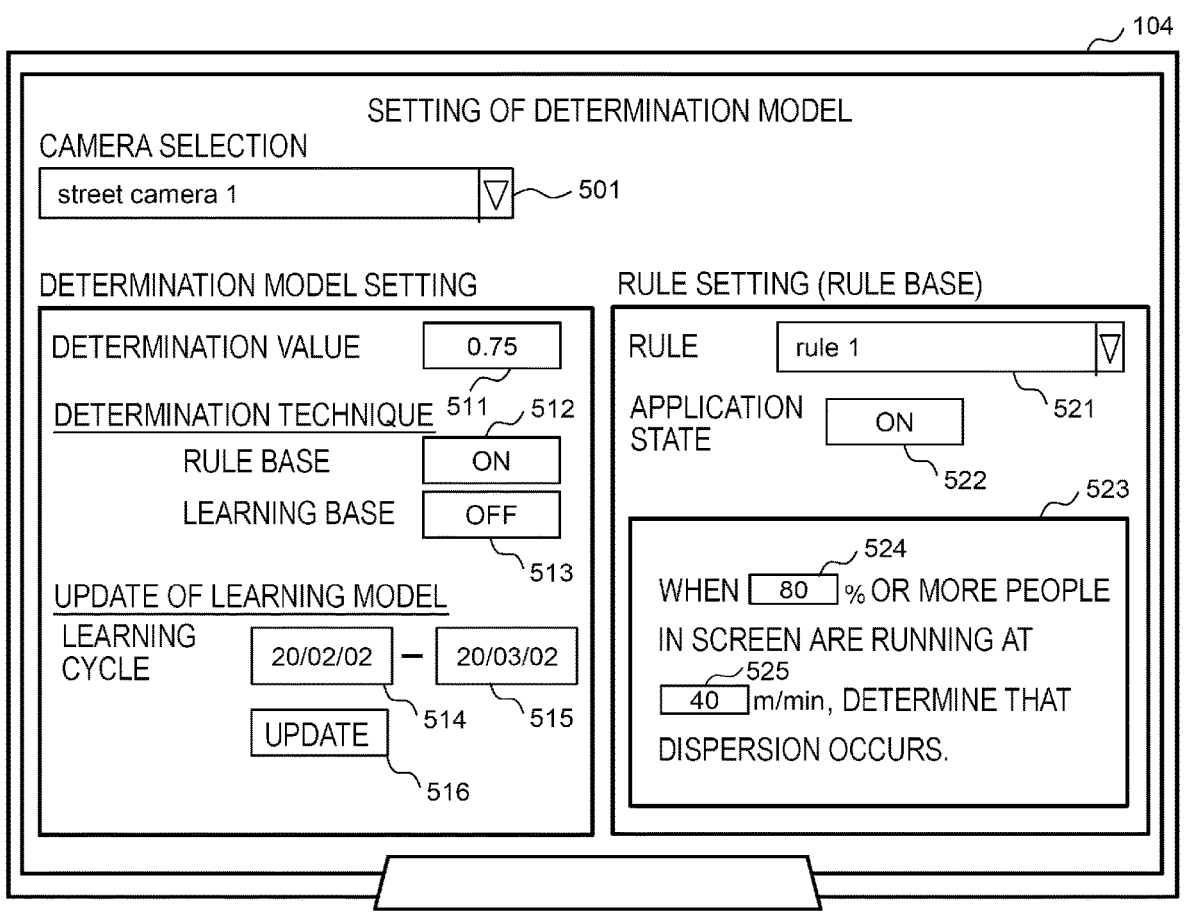
FIG. 5 is a diagram showing an example of a screen according to the first embodiment.

FIG. 5 is a diagram showing an example of a screen (determination model setting screen) displayed on the display device 104. The determination model setting screen is a screen for a user to set the determination model retained in the determination model store 124.

The determination model setting screen is configured to include a camera selection list 501, a determination value input unit 511, a rule base switch 512, a learning base switch 513, a learning period start date input unit 514, a learning period end date input unit 515, a learning parameter update button 516, a rule selection list 521, an application state switch 522, a rule description pane 523, a number-of-people ratio input unit 524, and a moving speed input unit 525.

The camera selection list 501 is a drop-down list in which any one or more cameras 101 can be selected from the list of all the cameras 101 handled by the event analysis system 100. A user can designate the camera 101 to register a determination model in the determination model store 124 by selecting one or more cameras 101 from the camera selection list 501. When a plurality of cameras 101 are selected, determination models having the same content are registered all at once.

The determination value input unit 511 receives a numerical value to be used in determining the track state for estimating the occurrence of the specific event.

The rule base switch 512 receives a selection value of ON or OFF on whether or not to use the rule-based technique in determining the track state. The learning base switch 513 receives a selection value of ON or OFF on whether or not to use the machine learning technique in determining the track state. It is impossible to turn off both the rule base switch 512 and the learning base switch 513. On the other hand, it is possible to turn both on, that is, to use both the rule-based technique and the machine learning technique in determining the track state.

The learning period start date input unit 514 and the learning period end date input unit 515 are a period for designating the track data to be used in determining the track state.

The learning parameter update button 516 receives the start of the machine learning model update processing. When the user presses the learning parameter update button 516, the event analysis system 100 starts the machine learning parameter update processing. At this time, the event analysis system 100 uses the track data in the range of the date and time inputted to the learning period start date input unit 514 and the learning period end date input unit 515 for machine learning.

The rule selection list 521 displays respective rules for the rule-based technique to be used when the rule base switch 512 is set to ON, and receives any selection. The application state switch 522 receives a selection value of ON or OFF on whether or not to apply the rule designated by the user in the rule selection list 521.

The rule description pane 523 displays the content of the rule designated by the user by the rule selection list 521. When the application state switch 522 is OFF, the rule description pane 523 may be displayed such that the user can easily recognize that it is in an invalid state. For example, the rule description pane 523 may display grayed-out content or may not display the content.

The rule description pane 523 includes input units for displaying the details of the rules and receiving the content, such as numerical values, which needs to be designated by the user for each rule. The rule description pane 523 includes the number-of-people ratio input unit 524 and the moving speed input unit 525. In this way, the user can generate a rule to "determine that the dispersion is occurring when the ratio of the number of people designated by the number-of-people ratio input unit 524 is moving at the speed designated by the moving speed input unit 525 or faster on the screen". The rule generated in this way is retained in the determination model store 124 and is used in the determination unit 125 to estimate the occurrence of the specific event. That is, when the rule designated here is determined to be conformed with, it is estimated that the specific event is occurring.

In addition, the determination model setting screen in FIG. 5 is an example, and any screen design may be used as long as the information to be received is the same. For example, the screen may be designed in a spreadsheet-like form in which a title row has names of respective parameters and each row provides input cells for respective parameters of the camera 101. Further, the determination model setting screen may have an interface for receiving an input of a file, and the content of the screen may be updated based on the information of the designated file.

Figure 6:
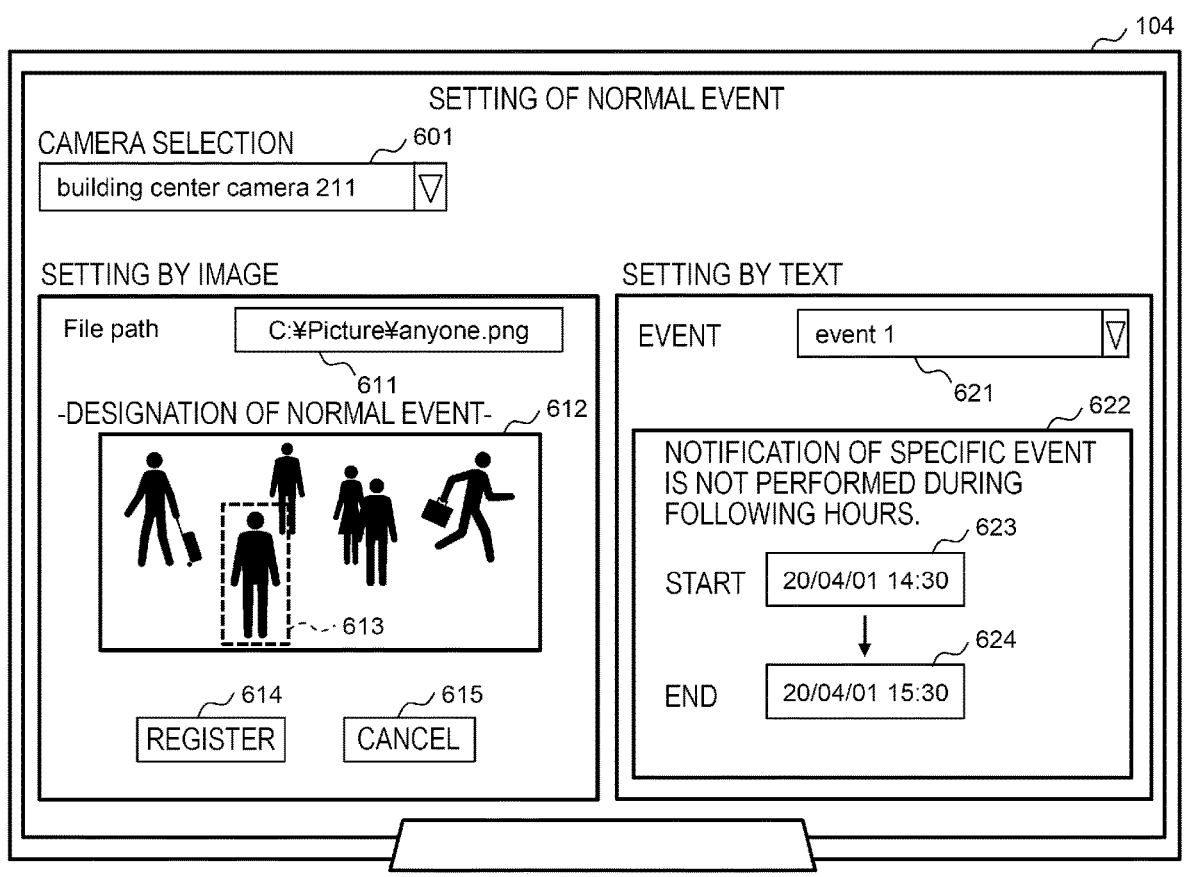
FIG. 6 is a diagram showing an example of a screen according to the first embodiment.

FIG. 6 is a diagram showing an example of a screen (normal event setting screen) displayed on the display device 104. The normal event setting screen is a screen for the user to set the normal event retained in the normal event store 132.

The normal events setting screen is configured to include a camera selection list 601, a file path input unit 611, an object selection unit 612, an object selection frame 613, a registration button 614, a delete button 615, an event selection list 621, an event description pane 622, an event start time input unit 623, and an event end time input unit 624.

The camera selection list 601 is a drop-down list in which any one or more cameras 101 can be selected from the list of all the cameras 101 handled by the event analysis system 100. A user can designate the camera 101 to register the normal event in the normal event store 132 by selecting one or more cameras 101 from the camera selection list 601. When a plurality of cameras 101 are selected, normal events having the same content are registered all at once.

The image or video designated by the user in the file path input unit 611 is displayed in the object selection unit 612. For example, the image or video designated by the user is an image showing the appearance of a mascot character, a costumed character, a motor vehicle, a robot, or the like, an image reflecting the operating state of an event device such as projection mapping, and a motion video of an object such as a person.

When the user operates a mouse, touch panel, touch pen, or the like which is the input device 103 and designates a normal event, a frame line for confirming the designation result is displayed as the object selection frame 613.

When the user designates the normal event, the recognition unit 121 executes object recognition processing, motion recognition processing, and the like on the image or video designated by the user, and one or more areas serving as the normal event candidates are displayed on the object selection unit 612, and the user may select the normal event from the proposed candidates. For example, when the user selects an image in the file path input unit 611, the object selection unit 612 is displayed, and at the same time or thereafter, the object selection frame 613 is displayed in a blinking manner. Subsequently, when the user brings the touch pen closer to the object selection frame 613, the color of the object selection frame 613 changes. Subsequently, when the user touches the inside of the object selection frame 613 with the touch pen, the object selection frame 613 stops blinking and turns into a constant display mode, and the selection is completed. Such a designation method may be employed.

When the user presses the registration button 614, the normal event designated in the object selection unit 612 is retained in the normal event store 132. In addition, the user can cancel the registered normal event by pressing the delete button 615. Cancellation of the normal event may be realized by a method of double-clicking the object selection frame 613 by the user.

In addition, the user can designate the normal event by a method other than the designation by image. FIG. 6 also shows an example in which the normal event is designated by text. The event selection list 621 is a drop-down list for displaying individual IDs of the normal events and for receiving name changes and additions by the user. The user can add a new normal event to the event selection list 621 and select a registered normal event therefrom. Further, the individual names registered in the event selection list 621 can be freely set by the user.

In the event description pane 622, the content of individual normal events designated by the user in the event selection list 621 is displayed. In the example shown in FIG. 6, the event description pane 622 includes the start time input unit 623 and the end time input unit 624. The user can register the period from the date and time designated in the start time input unit 623 to the date and time designated in the end time input unit 624 as the normal event for the camera 101 designated from the camera selection list 601. The registered normal event is retained in the normal event store 132. By such a method, the user can prevent the notification of the specific event from being sent for a certain period of time for the certain camera 101. For example, although an image or a video that can be used in registering the normal event with the object selection unit 612 is not included, the place and time of the normal event are useful if they can be found out.

Figure 7A:
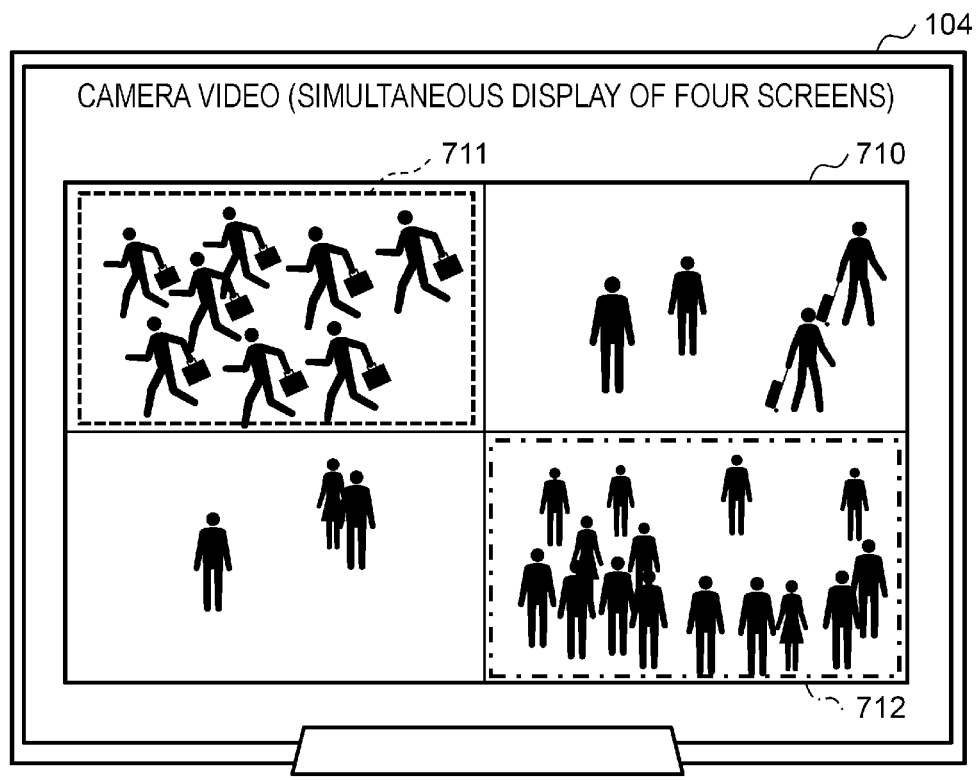
FIG. 7A is a diagram showing an example of a screen according to the first embodiment.
Figure 7B:
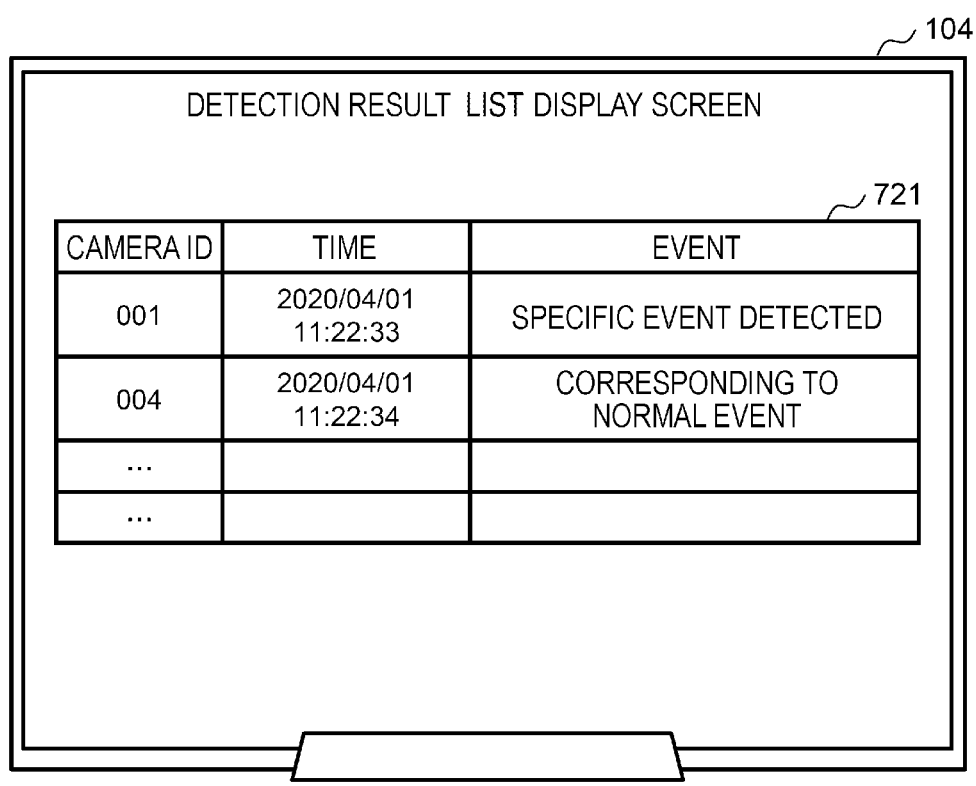
FIG. 7B is a diagram showing an example of a screen according to the first embodiment.

FIGS. 7A and 7B are diagrams showing an example of a screen (detection result display screen) displayed on the display device 104. The detection result display screen is a screen for the user to check a specific event notified by the computer 110.

FIG. 7A shows an example of concurrently displaying the detection result and the video captured by the camera 101. FIG. 7B shows an example of displaying the detection result as time-series character string data. The screen displays of FIGS. 7A and 7B may be switched by a user operation, or the screen may display an integrated content of the two.

In the example of FIG. 7A, the display area 710 shows a case where the images of four cameras 101 are displayed (display in four divisions). However, the event analysis system 100 may display a full image of one camera 101 or may perform a divided display with different numbers of divisions. The dotted line drawn in the display area 710 is a specific event highlighting display 711 and the dash-and-dot line is a highlighting display 712 corresponding to the normal event.

The specific event highlighting display 711 is a display for notifying the user of a warning of the specific event. The specific event highlighting display 711 is indicated by the dotted line in the notation but may be in any display mode as long as the user can recognize the warning of the specific event. For example, the event analysis system 100 may display a lighted or blinking colored frame line, or display a mark on a portion of the frame of the corresponding camera display, or display a character string such as "specific event detected" on a lower portion of the frame.

The highlighting display 712 corresponding to the normal event is a display for notifying the user that the specific event was detected by the determination unit 125 but has been filtered by the filter unit 131. The highlighting display 712 corresponding to the normal event is a dotted line in notation, but any display mode may be used as long as the highlighting display 712 corresponding to the normal event can be visually differentiated from the specific event highlighting display 711.

The display area 710 may not include the highlighting display 712 corresponding to the normal event. Further, the event analysis system 100 may include a setting screen on which the user can select whether or not to display the highlighting display 712 corresponding to the normal event.

FIG. 7B shows an example of a detection result list 721 for notifying the user of an event detected as the specific event, and an event detected as the specific event but filtered to be the normal event in a log of a time-series format. The detection result list 721 may have a function of transitioning to the screen of FIG. 7A that displays the video of the corresponding camera ID and the time when a corresponding row is clicked.

The screens shown in FIGS. 7A and 7B allow the user to easily recognize the specific event to be dealt with immediately and its camera area. In addition, based on the kind of event, the user can recognize the camera area where the people's traffic flow is different from the ordinary time but does not call for an immediate response.

Figure 8:
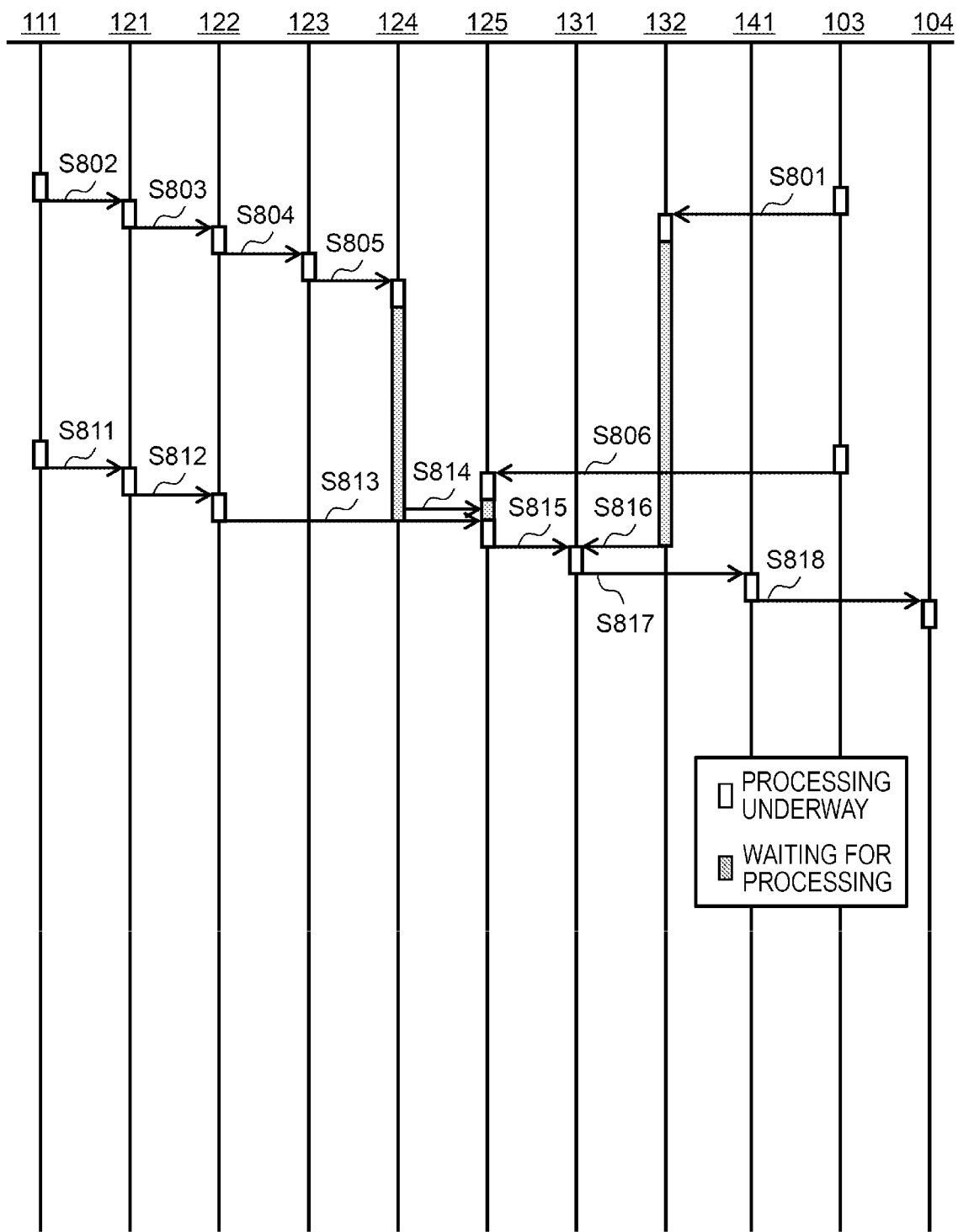
FIG. 8 is a diagram showing an example of a processing sequence according to the first embodiment.

FIG. 8 is a diagram showing an example of a processing sequence of the event analysis system 100. Hereinafter, the processing sequence of the event analysis system 100 will be described with reference to FIG. 8.

Steps S801 through S806 form a processing sequence relating to pre-setting and learning for the use of the event analysis system 100.

First, the normal event store 132 receives the normal event input by the user from the input device 103 (step S801) and retains the received normal event.

Next, the input unit 111 notifies the recognition unit 121 of the video data (image or video) received from the camera 101 and/or the storage device 102 (step S802). The recognition unit 121 recognizes an object and an action in the video data received from the input unit 111. The recognition result of the object by the recognition unit 121 is sent to the estimation unit 122 (step S803). Next, the estimation unit 122 estimates the track of each person in the video based on the recognition result of the person. The estimated track is sent to the learning unit 123 (step S804). The learning unit 123 learns the track, and the determination model generated by the learning is sent to the determination model store 124 and retained (step S805).

Through a series of processing, the determination model store 124 acquires a determination model for determining that the track is the normal track that is obtained by learning the ordinary moving paths of people in the camera area. The determination model store 124 may receive and retain the determination rule input by the user through the input device 103. In addition, the determination unit 125 may receive a selection of the determination technique of the specific event from the user (step S806).

Steps S811 through S818 form a processing sequence relating to the detection of the specific event by the event analysis system 100.

Since steps S811 and S812 are the same as steps S802 and S803, the description thereof will be omitted. Next, the determination unit 125 receives the track estimated in step S812 (step S813). Further, the determination unit 125 receives a determination model selected in advance or designated by the user in step S806 from the determination model store 124 (step S814).

The determination unit 125 detects an occurrence of the specific event by determining whether or not the track received from the estimation unit 122 is different from the ordinary track. At this time, when the determination model is based on machine learning, the certainty degree of determination, the probability of correct answer, and the like may be calculated. In such a case, a comparison is made with the determination value inputted in the determination value input unit 511, and the processing of determining the difference from the ordinary time may be performed only when the certainty degree when the difference from the ordinary time has been detected is equal to or higher than the determination value.

The determination unit 125 notifies the filter unit 131 of the detection result of the specific event (step S815). The filter unit 131 receives a condition for the normal event from the normal event store 132 (step S816). The filter unit 131 determines whether or not the specific event candidate satisfies the condition for the normal event and notifies the output unit 141 of the specific event when it is determined that the specific event candidate does not correspond to the normal event (step S817). The output unit 141 configures a screen (result display screen) to notify the user that the specific event occurred and generates screen information. The result display screen is displayed on the display device 104 (step S818).

According to the present embodiment, since the specific event is appropriately estimated, it is possible to reduce false warnings and improve the efficiency of operations such as surveillance operations and security operations.

(2) Second Embodiment

Figure 9:
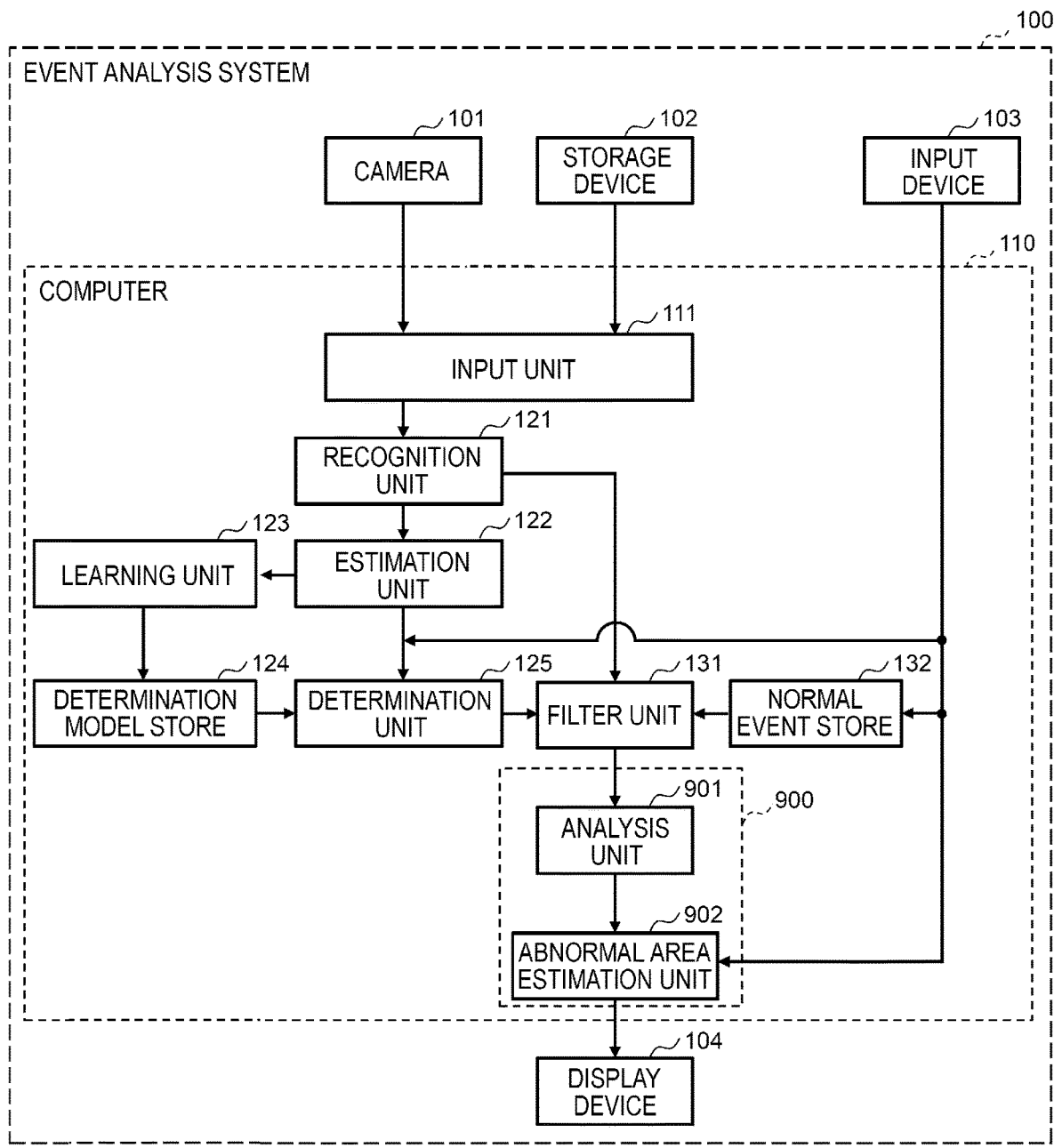
FIG. 9 is a diagram showing an example of a configuration relating to an event analysis system according to a second embodiment.

FIG. 9 is a diagram showing an example of a configuration according to the event analysis system 100 of the present embodiment. The same reference numerals are used for the same configurations as those of the first embodiment, and the description thereof will be omitted as appropriate.

The event analysis system 100 further includes an area estimation unit 900. The area estimation unit 900 includes an analysis unit 901 and an abnormal area estimation unit 902.

The analysis unit 901 performs vector analysis on the track data related to the specific event received from the filter unit 131 and calculates a track feature amount. When it is determined that the specific event has occurred in the camera area based on the track feature amount received from the analysis unit 901, the abnormal area estimation unit 902 estimates a location (occurrence location) where the specific event has occurred in the camera area of the camera 101.

The display device 104 is notified of the occurrence location (estimated value) of the specific event estimated by the abnormal area estimation unit 902.

Figure 10:
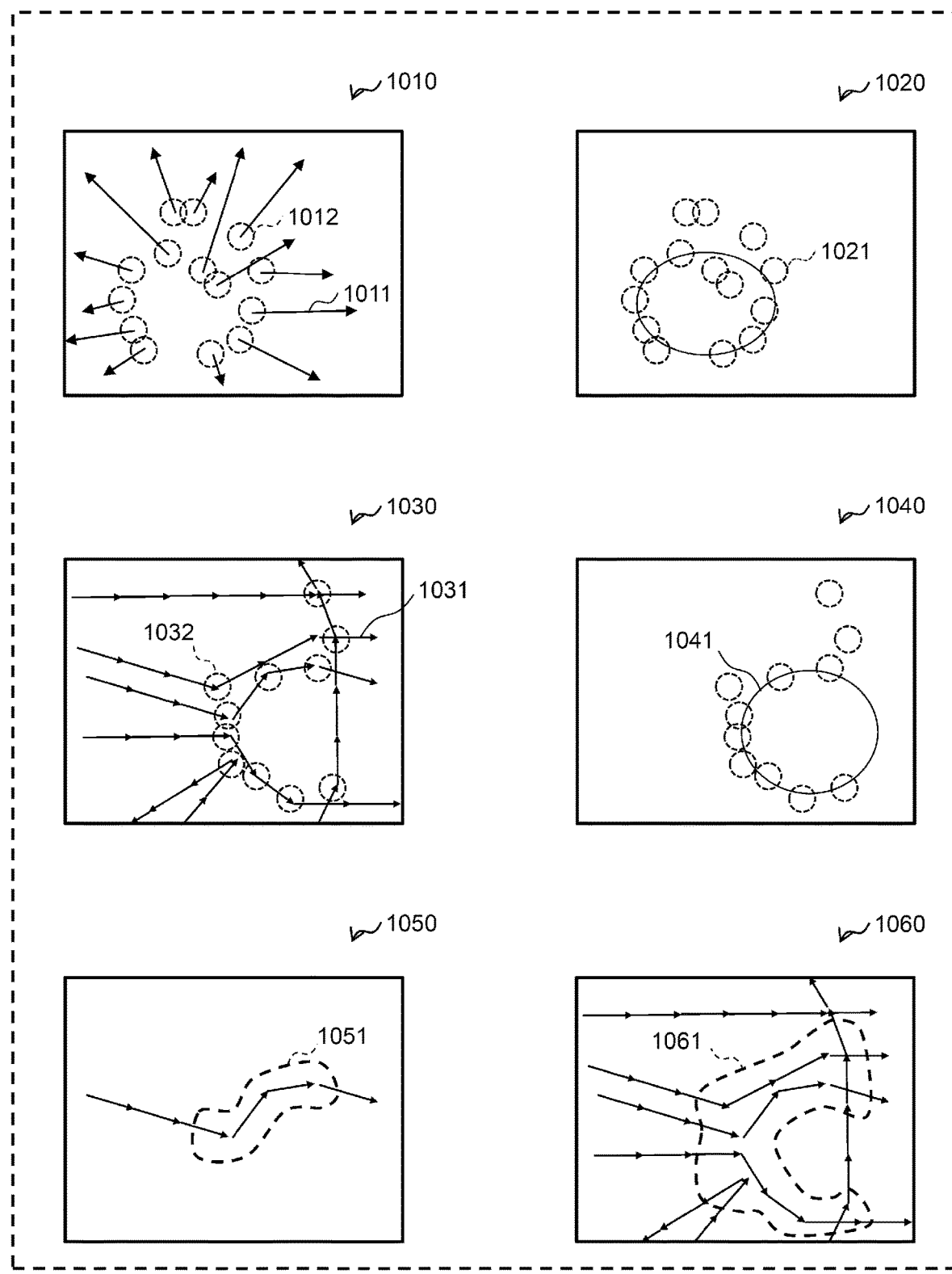
FIG. 10 is a diagram for illustrating a technique of estimating an abnormal area according to the second embodiment.

FIG. 10 is a diagram for illustrating a technique of estimating the occurrence location (abnormal area) of the specific event.

An explanatory diagram 1010 and an explanatory diagram 1020 are explanatory diagrams corresponding to a camera area of any camera 101. A plurality of arrows in the drawing indicate a track 1011 of each person. The track 1011 is the estimation result by the estimation unit 122. That is, the explanatory diagram 1010 does not illustrate the video of the camera area, but is an explanatory diagram reflecting the analysis result in a time range required to check the track. Here, the dashed circle in the explanatory diagram 1010 indicates a motion vector start point 1012 of each track 1011. The motion vector start point 1012 is a result obtained from the analysis unit 901.

The vector start point 1012 is not necessarily a start point of the walking track. For example, the track 1011 may be a track except for the track of a walking section, that is, it may be a track of a running section, and the vector start point 1012 may be the start point of the track of the person who broke into running. Further, although the vector start point 1012 is calculated as the coordinates of the point as a result of the vector analysis, it may be designated as an area having any extent set in advance.

The explanatory diagram 1020 is an explanatory diagram in which an abnormal area 1021, which is an estimated area of the occurrence location of the specific event, is superimposed on a diagram from which the track 1011 of explanatory diagram 1010 is removed. In this example, the abnormal area estimation unit 902 estimates the abnormal area 1021 to be an ellipse that most passes through the vector start point 1012 received from the analysis unit 901. The abnormal area 1021 may be estimated to be a circle or the like whose center and radius are obtained from the distribution of the vector start points 1012.

An explanatory diagram 1030 and an explanatory diagram 1040 are explanatory diagrams of an example of the tracks different from the explanatory diagram 1010 and the explanatory diagram 1020 and are explanatory diagrams corresponding to the camera area of any camera 101. The arrows in the drawings indicate the track 1031 of each person segmented at regular time intervals. Here, although it is segmented by time, it may be expressed as a series of arrows as shown in the explanatory diagram 1010.

The dashed circle in the explanatory diagram 1030 indicates the place where the track 1031 changed directions and this is referred to as a direction change area 1032. The direction change area 1032 is obtained by analyzing the track 1031 by the analysis unit 901. The analysis unit 901 may obtain the direction change area 1032 as the position coordinates corresponding to the inflection point of the partial differential value for each direction of the track 1031.

The explanatory diagram 1040 is an explanatory diagram in which an abnormal area 1041 of the occurrence location of the specific event is superimposed on the explanatory diagram 1030 from which the track 1031 is removed. In this example, as in the case of the camera area 1001, the abnormal area estimation unit 902 estimates the abnormal area 1041 as an ellipse that most passes through the direction change area 1032 received from the analysis unit 901.

Information such as pictures, characters, and numerical values indicating the abnormal area 1021 and the abnormal area 1041 may be displayed on the screens shown in FIGS. 7A and 7B (for example, displayed to be superimposed on the video).

Further, the analysis unit 901 may obtain a spatial potential in the camera area based on the total differential values, the partial differential values for each direction, and the like of the respective tracks 1011 and 1031, and estimate the abnormal area 1021 and the abnormal area 1041 based on the obtained spatial potential. An example of estimating the abnormal area based on the spatial potential will be described with reference to explanatory diagrams 1050 and 1060.

The explanatory diagram 1050 shows one of the tracks 1031 in the explanatory diagram 1030. Here, the spatial potential U(x, y) corresponding to the camera area can be obtained as $U(x+r, y+r)=-f(r)*(|D(vx)/dt|+|D(vy)/dt|)$ where the velocity vector of the track 1031 at a certain point (x, y) is (vx, vy). Here, r is any distance, and f(r) is a weighting function. For example, it is a monotonic function whose value is 1 at r=0 and 0 at r=r.

In this way, the spatial potential U(x, y) with a potential drop portion 1051 is obtained. If the same processing is applied to all the tracks 1031 in the explanatory diagram 1030, the spatial potential U(x, y) with a potential drop portion 1061 as shown in the explanatory diagram 1060 can be obtained. The abnormal area estimation unit 902 obtains the spatial potential by such a procedure and may output the potential drop portion 1061 as an abnormal area or may estimate an area consisting of (x, y) satisfying U(x, y)<Uth for any threshold potential Uth as an abnormal area.

According to the present embodiment, the abnormal area in the camera area can be estimated.

(3) Third Embodiment

Figure 11:
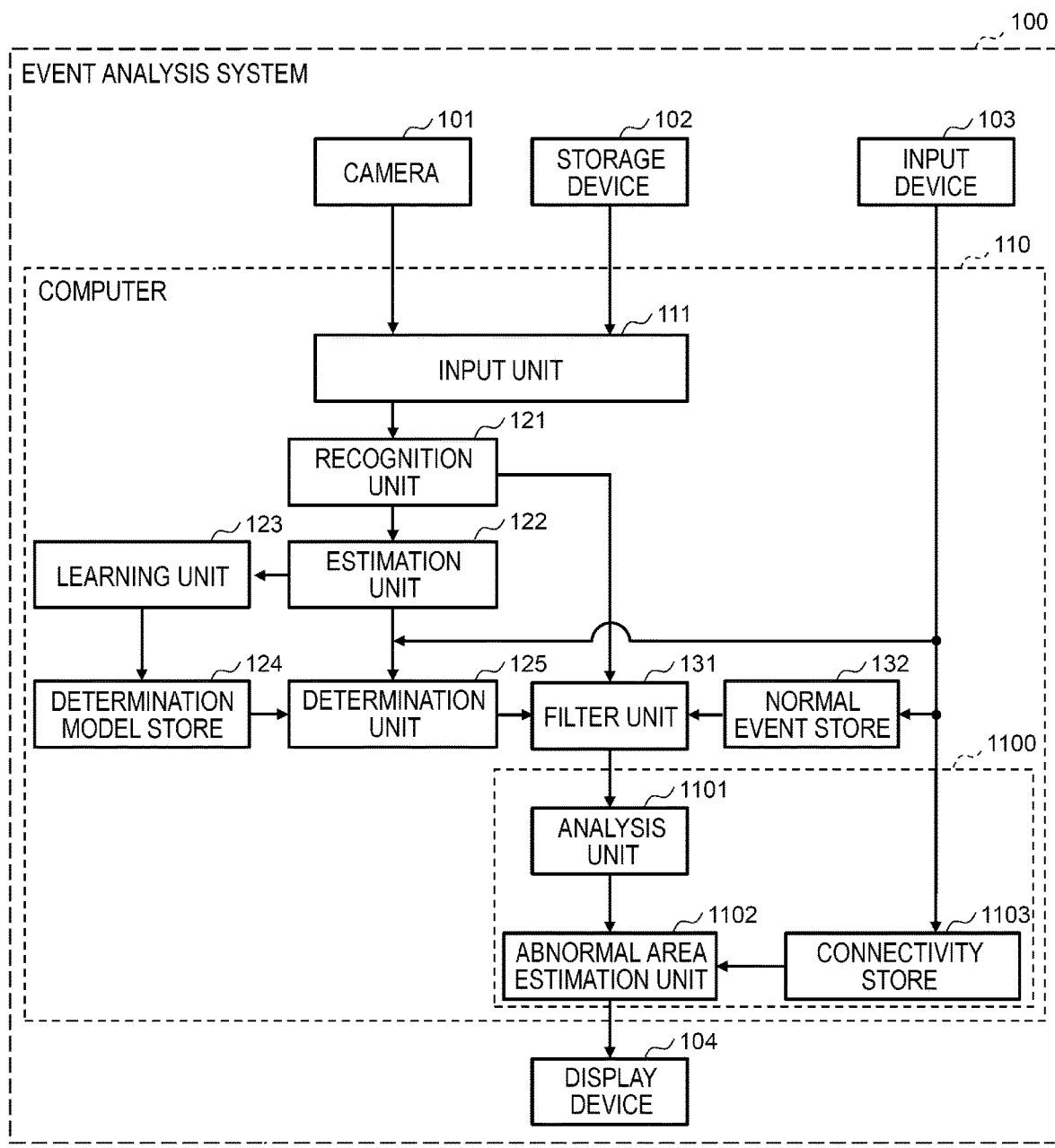
FIG. 11 is a diagram showing an example of a configuration relating to an event analysis system according to a third embodiment.

FIG. 11 is a diagram showing an example of a configuration according to the event analysis system 100 of the present embodiment. The same reference numerals are used for the same configurations as those of the first embodiment and the second embodiment, and the description thereof will be omitted as appropriate.

The event analysis system 100 further includes an area estimation unit 1100. The area estimation unit 1100 includes an analysis unit 1101, an abnormal area estimation unit 1102, and a connectivity store 1103.

The present embodiment will be described on a premise that the input unit 111 receives video data of a plurality of cameras 101.

The analysis unit 1101 performs vector analysis on the track data relating to the specific event received from the filter unit 131 and calculates a track set feature amount. More specifically, the track set feature amount is a statistical value calculated based on a velocity vector obtained from the tracks of a plurality of people. In the present embodiment, the track set feature amount will be described in terms of the mean value and variance of the respective velocity vectors. However, the track set feature amount may be another statistical value such as a maximum value, a minimum value, a difference between the maximum value and the minimum value, a mode, a median value, a standard deviation, and the like. The analysis unit 1101 may have the function of the analysis unit 901.

The connectivity store 1103 retains location information indicating a location of the camera area of the camera 101 in the facility. If the camera 101 is movable, the connectivity store 1103 updates the current location and retains the same. The movable camera 101 includes a wearable camera, an in-vehicle camera, a robot-mounted camera, a camera mounted on a smartphone, a camera mounted on a notebook PC, and the like. To update the current location of the movable camera 101, the location information acquired by Global Positioning System (GPS), beacon, or the like may be used, or an estimated position acquired via communication with a wireless communication network (WiFi and the like) may be used, or a location estimated by analyzing subject information of a subject in the video may be used. The connectivity store 1103 may further retain connection information as a traffic path for each camera area.

When it is determined with a plurality of cameras 101 that the dispersion is occurring based on the track set feature amount received from the analysis unit 1101, the abnormal area estimation unit 1102 further estimates an occurrence location (abnormal area) of the specific event outside the camera area of the plurality of cameras 101 by using the location between each camera area received from the connectivity store 1103, or the connectivity information of the route between the location and each camera area. The abnormal area estimation unit 1102 may have the function of the abnormal area estimation unit 902.

The display device 104 is notified of the occurrence location of the specific event estimated by the abnormal area estimation unit 1102.

FIG. 12 is a diagram for describing the relationship among the camera area of the camera 101, the moving path of a person, and the abnormal area.

An explanatory diagram 1210 shows an example of a map showing the positional relationship of the cameras 101 retained in the connectivity store 1103. The explanatory diagram 1210 shows an example in which four cameras 101 are installed in the facility 1211. The dashed circles in the explanatory diagram 1210 indicate camera areas 1212 to 1215 (areas surveillanced by the respective four cameras 101). The blank portion in the explanatory diagram 1210 indicates a passage and the black line hatched portion indicates an area other than the passage.

A connection table 1220 is a table in which each of the camera areas 1212 to 1215 in the explanatory diagram 1210 is associated with the distances between the movable and adjacent camera area (camera 101) and the corresponding camera area (camera 101). The connectivity store 1103 may retain data in a map format as in the explanatory diagram 1210 or may retain information on the connectivity of the camera areas tabulated as in the connection table 1220. Further, the connectivity store 1103 may retain both of the above. Further, the connectivity store 1103 may retain information except for the distance information of the connection table 1220 or may further retain data in other expression formats including the information equivalent to the information included in the explanatory diagram 1210 or the connection table 1220.

An explanatory diagram 1230 is a diagram in which arrows indicating the tracks of people are superimposed on the explanatory diagram 1210. The explanatory diagram 1230 shows an example in which a plurality of people are evacuated in the facility 1211.

An explanatory diagram 1240 is a diagram in which an abnormal area 1241 is superimposed on the explanatory diagram 1210. The event analysis system 100 shows the result of estimating the occurrence location of the abnormal area outside the camera area based on the dispersion states of a plurality of people in each of the adjacent camera areas of the explanatory diagram 1230. That is, the analysis unit 1101 analyzes the tracks of a plurality of people in each camera area, and based on the result, the abnormal area estimation unit 1102 estimates the abnormal area 1241 based on the connectivity information of the camera area retained in the connectivity store 1103. In this example, the analysis unit 1101 calculates the average location of the start points of the motion vectors of a plurality of people and estimates the abnormal area 1241 which is an area outside the camera area where the start points of each camera area can be connected.

Information such as pictures, characters, and numerical values indicating the abnormal area 1241 may be displayed on the display device 104 with or without being associated with the facility map.

Even though a large number of cameras 101 are installed in the facility, it is difficult to install enough cameras 101 to constantly capture the entire area, and the camera area sometimes may have blind spots. Further, the camera are disposed so as to be able to monitor the entire camera areas if the camera 101 is manipulated by using a PTZ camera, but the entire camera areas cannot be surveillanced at the same time and the blind spot sometimes occurs. Further, even if the facility is not large in scale, the blind spot may occur in the camera area when the camera 101 is installed only in areas where surveillance is important.

Therefore, when a highly urgent specific event occurs, it is difficult to find out the specific event by the video if the specific event occurs in the blind spot in the camera area. Further, even if it is possible to check that a plurality of people are dispersed (evacuated) in a plurality of camera areas in the facility by using the monitor of the camera 101, it is not easy to guess the abnormal area by understanding the relationship between the respective cameras 101. In this way, there is a problem that, when a blind spot occurs in the camera area, it is difficult to estimate the abnormal area where the abnormality has occurred until a security guard or the like patrols the site.

According to the event analysis system 100 of the present embodiment, when people are evacuated in a direction in a plurality of cameras 101, it becomes possible to estimate the occurrence location of the specific event in an area that is not captured by the cameras 101. In addition, the event analysis system 100 may further include a camera control unit and manipulate the camera 101 so as to be able to surveillance the abnormal area estimated by the abnormal area estimation unit 1102.

Figure 13:
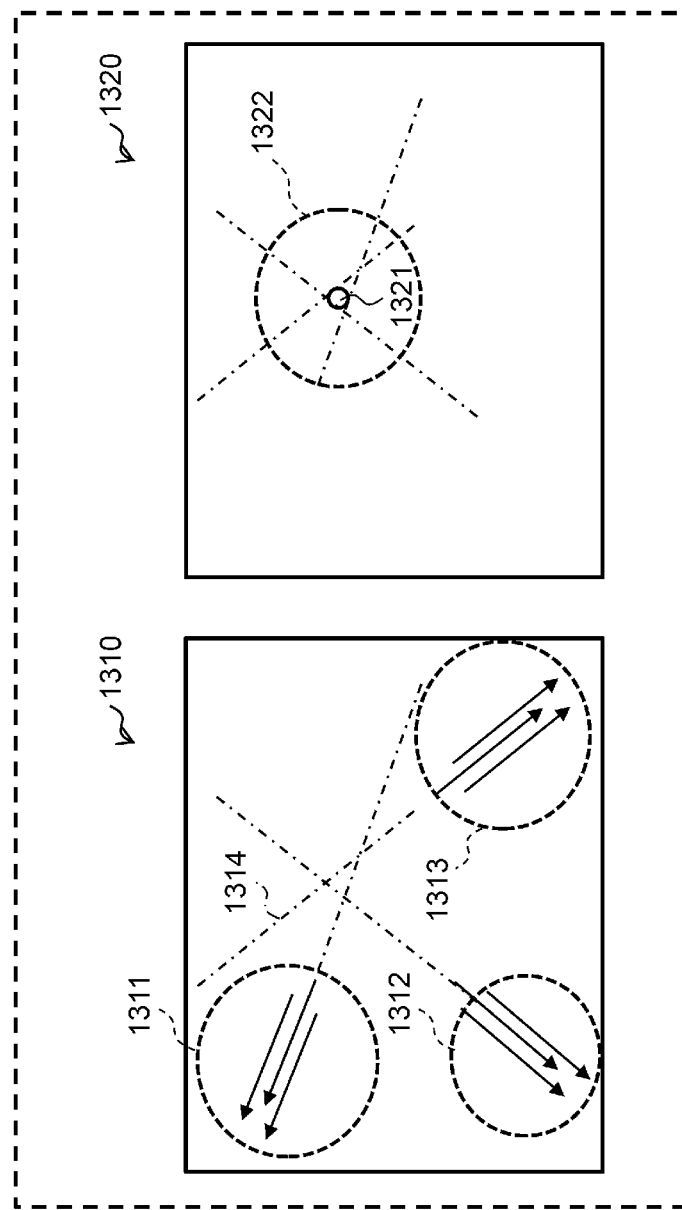
FIG. 13 is a diagram for illustrating a relationship among the camera area, the moving path of a person, and the abnormal area according to the third embodiment.

Further, the event analysis system 100 is not limited to the application to the camera 101 installed in a place where the path is restricted as shown in FIG. 12 and can also be applied to the camera 101 installed in an open space as shown in FIG. 13.

FIG. 13 shows a diagram for illustrating the relationship among the camera area, the moving path of a person, and the abnormal area in an open space such as a park, a plaza, and the like, and shows an example of a case where a plurality of people are evacuated.

An explanatory diagram 1310 is a diagram in which arrows indicating the tracks of people are superimposed on a diagram of the open space in which three cameras 101 are installed. The dashed circles in the explanatory diagram 1310 are the camera areas 1311, 1312, and 1313 (the areas surveillanced by each of the three cameras 101). The dash-and-dot lines in explanatory diagram 1310 show extension lines of the moving path vector calculated from the tracks of people in each camera area and are referred to as track vector extension lines 1314.

An explanatory diagram 1320 is a diagram showing the track vector extension lines 1314 shown in the explanatory diagram 1310, with a center of gravity 1321 at the intersection of each of the extension lines, and an abnormal area 1322 centered on the center of gravity 1321.

In the event analysis system 100, the analysis unit 1101 calculates the track vector extension lines 1314 from the tracks of a plurality of people in each camera area. The abnormal area estimation unit 1102 calculates the center of gravity 1321 at the intersection of the track vector extension lines 1314 and estimates the abnormal area 1322 with reference to any ratio to the distance between the center of gravity 1321 and each camera area. FIG. 13 shows an example of the adjacent camera areas in the open space. In this case, the event analysis system 100 may not include the connectivity store 1103.

On the other hand, in a large-scale surveillance system, the abnormal area 1322 may sometimes become too large and have no significance as information when the camera areas are far apart. In such a case, the abnormal area estimation unit 1102 may group a plurality of cameras into camera groups within any distance with reference to the connectivity store 1103 and estimate the abnormal area 1322 for each group.

In addition, information such as pictures, characters, numerical values, and the like indicating the abnormal area 1241 and the abnormal area 1322 may be displayed on the display device 104 with or without being associated with the open space map.

According to the present embodiment, even if the specific event occurs outside the camera area, it is possible to estimate between which cameras 101 the specific event has occurred.

(4) Fourth Embodiment

Figure 14:
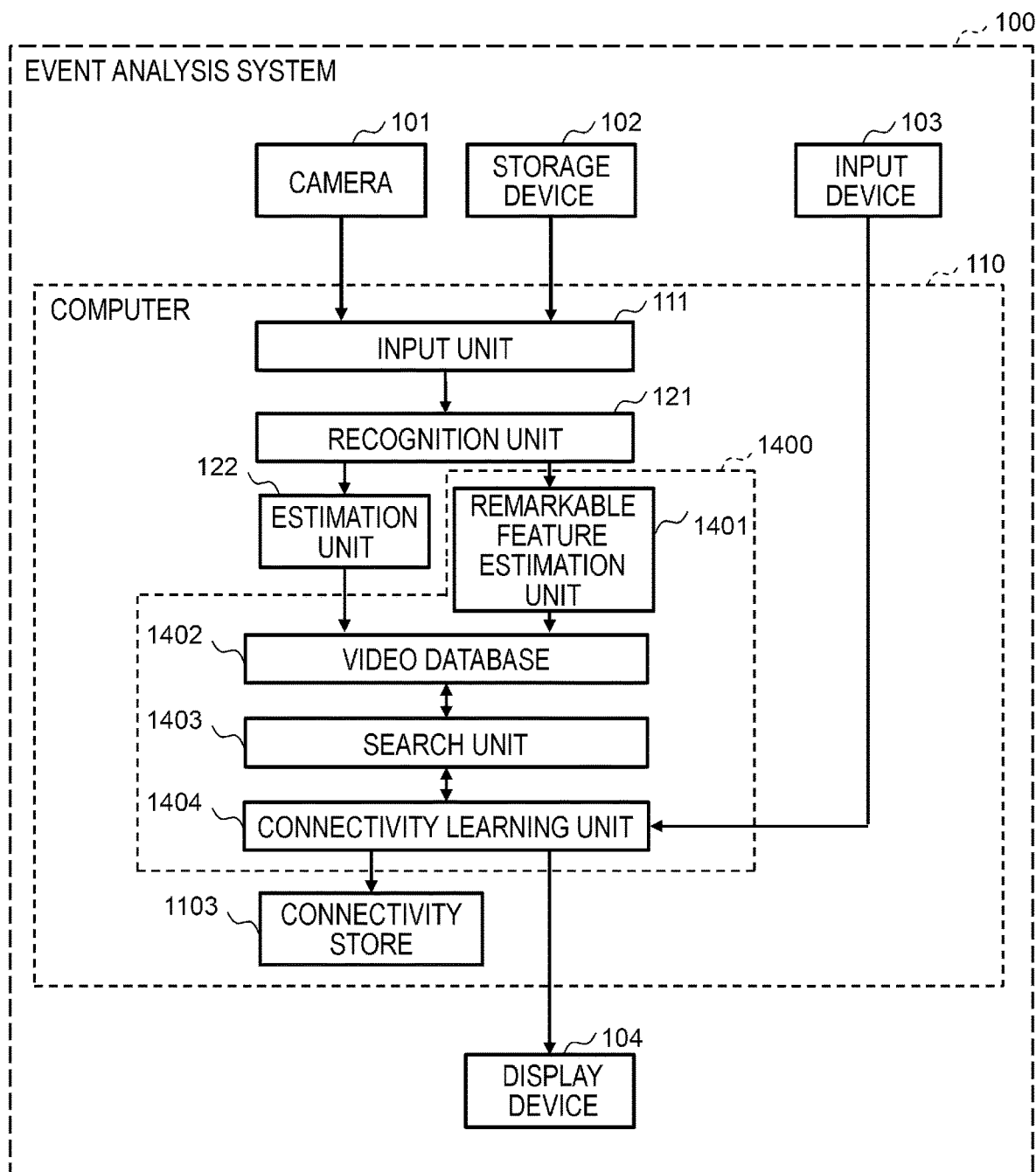
FIG. 14 is a diagram showing an example of a configuration relating to an event analysis system according to a fourth embodiment.

FIG. 14 is a diagram showing an example of a configuration according to the event analysis system 100 of the present embodiment. The same reference numerals are used for the same configurations as those of the first embodiment to the third embodiment and the description thereof will be omitted as appropriate. However, in the present embodiment, the learning unit 123, the determination model store 124, the determination unit 125, the filter unit 131, the normal event store 132, the analysis unit 901, and the abnormal area estimation unit 1102 are not shown in notation.

The event analysis system 100 of the present embodiment further includes a camera connection learning unit 1400. The camera connection learning unit 1400 includes a remarkable feature estimation unit 1401, a video database 1402, a search unit 1403, and a connectivity learning unit 1404.

The remarkable feature estimation unit 1401 extracts features in a remarkable area of the object received from the recognition unit 121.

For example, when the object received from the recognition unit 121 is a person, the remarkable areas are a face area, a head area, a color of clothes, a pattern of clothes, belongings, or a posture (skeleton points, joint points, and the like of the person). The feature in the remarkable area is an image feature amount extracted from an image in such a remarkable area. The technique of extracting the remarkable features may change depending on the remarkable area, but the same method has to be used for the remarkable areas of the same type.

Further, a plurality of remarkable areas may be estimated for one object received from the recognition unit 121. When a plurality of remarkable areas are estimated, a plurality of remarkable features are extracted according to respective areas. Further, a plurality of remarkable features may be extracted for one remarkable area. Further, the estimation of the remarkable area and the extraction of the image feature amount in the estimated remarkable area does not need to be performed as separate sequences. For example, it may be realized by a deep neural network model that estimates the body location of a person and extracts the image features of the body location at the same time.

The video database 1402 retains the remarkable features extracted by the remarkable feature estimation unit 1401. The video database 1402 may further retain the track of a person estimated by the estimation unit 122.

The search unit 1403 executes a similar image search on the video database 1402 based on the search conditions received from the connectivity learning unit 1404. In addition, as for the similar image search technique, the technique described in Japanese Patent No. 6200306 may be used in addition to the method described herein.

The connectivity learning unit 1404 designates the search conditions, executes a search by the search unit 1403 a plurality of times, and estimates the connectivity of each camera area based on the search results received from the search unit 1403. The search conditions include, for example, searching using facial features, searching using head features, color features of clothes, and gait (manner of walking), and the like. If the similar image search is performed using any person in a certain camera 101 (referred to as camera A) as a query, it is possible to determine whether or not the person is photographed in another camera 101, and when the person is photographed in another camera 101 as a query, it is possible to specify the camera 101 (referred to as camera B) and detect the moving time from camera A to camera B. By applying this technique, it is possible to specify the next camera 101 to photograph after the search source camera 101, that is, to specify the adjacent camera area as a path.

Therefore, by executing similar image searches a plurality of times while changing the people as queries, it is possible to specify the camera area (camera area connectivity) that will be displayed first when moving from any camera area. Further, it is possible to estimate the time taken to move between the cameras 101 by the statistical analysis processing of the moving time of each person between the cameras 101. Here, the statistical processing of the moving time between the cameras 101 may use the mean value of the moving time of a plurality of people in any camera area or may be obtained by obtaining the moving distance by dividing the moving time of each person between camera areas by the walking time within the camera areas, and then dividing the average of these moving distances by the walking speed of an ordinary person. Further, other statistical values such as the median value may be used instead of the mean value. Further, the estimated value of the moving distance between the camera areas instead of the moving time may be retained as the connectivity information between the camera areas.

In the present embodiment, the description is presented by taking an example of a person as an object (moving object) moving between the cameras 101, but the moving object is not limited to a person. The moving object may be a machine such as a robot or a drone or may be an animal.

As described above, according to the connectivity learning unit 1404, it is possible to obtain the connectivity information of the camera area, such as the connection table 1220, based on the video captured by the camera 101.

According to the present embodiment, it is possible to learn the connectivity of the camera areas by using the videos captured by the cameras 101, and as a result, even when the connectivity information of the camera area cannot be retained in advance, it is possible to obtain the effect of estimating the abnormal area outside the camera area as shown in the third embodiment.

In addition, the connectivity store 1103 may retain in advance the connectivity of the camera areas relating to some of the cameras 101 handled by the event analysis system 100 of the present embodiment, and in this case, the connectivity of the camera areas may be learned for the camera 101 whose camera area connectivity is not retained.

(5) Appendix

The above-described embodiment includes the following content, for example.

In the embodiments described above, the cases where the present invention is applied to an event analysis system have been described, but the present invention is not limited thereto and can be widely applied to various other systems, devices, methods, and programs.

Further, in the embodiments described above, the configuration of each table is an example, and one table may be divided into two or more tables, or all or a part of the two or more tables may be combined into one table.

In the embodiments described above, while various kinds of data are described by using the XX table for the convenience of description, the data structure is not limited thereto and accordingly, may be expressed by using XX information, and the like.

In the above description, information such as a program, a table, a file, and the like that realizes each function can be stored in a storage device such as a memory, a hard disk, a solid state drive (SSD), or a recording medium such as an IC card, an SD card, DVD.

The embodiments described above include the following characteristic configurations, for example.

An event analysis system (for example, the event analysis system 100) includes an estimation unit (for example, the computer 110, the processor 201, the circuit, the estimation unit 122) that estimates the track of a person based on the video data (video, image, and the like) acquired by a camera (for example, the camera 101), a determination unit (for example, the computer 110, the processor 201, the circuit, and the determination unit 125) that determines, based on determination information (for example, the determination model) for determining a specific event (for example, the specific event), whether or not the track estimated by the estimation unit corresponds to the specific event, a filter unit (for example, the computer 110, the processor 201, the circuit, the filter unit 131) that removes, based on normal event information (for example, the normal event data, and the data table 301) for identifying a normal event (for example, the normal event), the normal event from the events that have been determined by the determination unit to correspond to the specific event, and an output unit (for example, the computer 110, the processor 201, the circuit, and the output unit 141) that outputs information indicating that an event is occurring after the normal event has been removed by the filter unit.

The normal event information is configured to include at least one piece of information on a subject (a person, equipment, and the like), an action (action, equipment operating state, and the like), or time, which is the target of the normal event (for example, see FIG. 3).

The determination information may be rule-based information or learning-based information. The information output by the output unit may be video as well as screen information for displaying an event after the normal event has been removed by the filter unit (see, for example, FIG. 7A). Further, the information output by the output unit may be screen information to be displayed as time-series character string data indicating an event after the normal event has been removed by the filter unit (for example, see FIG. 7B). The information removed by the output unit may include information on the events removed by the filter unit.

The output by the output unit 141 is not limited to the display on the display device 104. The output by the output unit 141 may be an audio output by a speaker, may be an output as a file, may be a print on a paper medium or the like by a printing device, may be a projection onto a screen or the like by a projector, or may be in some other forms.

In the above configuration, since the fact that the abnormal event, which is not the normal event, is occurring is output, the person in charge can easily understand the abnormal event, for example. According to the above configuration, for example, it is possible to suppress false detection of the normal event such as a normal gathering of people, normal dispersion of people, and the like, and reduce unnecessary check and response by the person in charge, so that the person in charge can efficiently perform the job.

The event analysis system includes a learning unit (for example, the computer 110, the processor 201, the circuit, the learning unit 123) that learns, by machine learning, an ordinary track of an object (person, robot, road surface, equipment, etc.) as the determination information based on the video data acquired by the camera.

In the above configuration, since the ordinary track of the object is machine-learned, it is possible to improve the accuracy of determining whether or not the specific event is occurring, for example.

The output unit outputs the information indicating an event removed by the filter unit (for example, the highlighting display 712 corresponding to the normal event shown in FIG. 7A and 721 "Correspond To Normal Event" shown in FIG. 7B).

In the above configuration, the information indicating the event removed by the filter unit is output, so that the person in charge can check the event removed by the filter unit, for example.

The event analysis system (for example, the event analysis system 100) includes an estimation unit (for example, the computer 110, the processor 201, the circuit, the estimation unit 122) that estimates the track of a person based on the video data (video, image, and the like) acquired by a camera (for example, the camera 101), a determination unit (for example, the computer 110, the processor 201, the circuit, and the determination unit 125) that determines, based on determination information (for example, the determination model) for determining a specific event (for example, the specific event), whether or not the track estimated by the estimation unit corresponds to the specific event, an area estimation unit (for example, the computer 110, the processor 201, the circuit, and the area estimation unit 900) that specifies, based on tracks of a plurality of people estimated by the estimation unit, a point where a movement of each of the plurality of people is changed and based on the specified point, estimates an area where the specific event has occurred in a capturing range of the camera, and an output unit (for example, the computer 110, the processor 201, the circuit, and the output unit 141) that outputs information indicating the area estimated by the area estimation unit (for example, the abnormal area 1021, and the abnormal area 1041).

The information indicating the area estimated by the area estimation unit may be display information indicating the abnormal area on a video or a map, may be numerical information indicating the abnormal area, or may be audio information indicating the abnormal area.

The point where the movement of each of the plurality of people changed may be the point (the point where the speed changed) where the person starts running from the state where the person was walking or standing still. Further, the point where the movement of each of the plurality of people changed may be the point where the person changed directions (direction is changed) while moving or may be the point where the spatial potential is relatively low or high.

In the above configuration, the area where the specific event has occurred in the capturing range of the camera is estimated and output, so that the person in charge can easily find out where in the capturing range the specific event has occurred, for example.

The event analysis system includes an area estimation unit (for example, the computer 110, the processor 201, the circuit, and the area estimation unit 1100) that estimates, based on the tracks of the plurality of people estimated by the estimation unit from the video data of each of a plurality of adjacent cameras, an area where the specific event occurred outside the capturing range of the plurality of cameras, and the output unit outputs information indicating the area (for example, the abnormal area 1241 and the abnormal area 1322) estimated by the area estimation unit.

In the above configuration, the area where the specific event has occurred outside the capturing range of the camera is estimated and output, so that the person in charge can find out the area even when the specific event has occurred in that area which becomes a blind spot of the capturing range. According to the above configuration, when the occurrence of the specific event is output, it is possible to avoid a situation in which the area where the specific event has occurred cannot be found.

The area estimation unit calculates a start point of the track of the person in capturing the range of each of the plurality of cameras based on location information (for example, the connection table 1220) indicating locations where the plurality of cameras are installed, and estimates an area where the specific event is occurring based on the calculated start point.

In the above configuration, since the area where the specific event occurs is estimated based on the start point of the track of the person in the capturing range of the camera whose location is known, the location of the area can be estimated.

The event analysis system includes a camera connection learning unit (for example, the computer 110, the processor 201, the circuit, and the camera connection learning unit 1400) that specifies a plurality of video data containing a predetermined moving object in the video data acquired by each of a plurality of cameras, and learns adjacent cameras with the plurality of cameras for which the specified plurality of video data is acquired.

In the above configuration, since the adjacent cameras are learned, the event analysis system can estimate the area where the specific event has occurred outside the capturing range of the camera even if the location information of the camera is not set, for example.

The configuration described above may be changed, rearranged, combined, or omitted as appropriate without departing from the gist of the present invention.

In addition, it should be understood that the items included in the list in the form of "at least one of A, B, and C" may mean (A), (B), (C), (A and B), (A and C), (B and C) or (A, B, and C). Similarly, the items listed in the form of "at least one of A, B, or C" may mean (A), (B), (C), (A and B), (A and C), (B and C) or (A, B, and C).

What is claimed is:

1. An event analysis system comprising:
an estimation unit that estimates a track of a person based on video data acquired by a camera;
a determination unit that determines, based on determination information for determining a specific event, whether or not the track estimated by the estimation unit corresponds to a specific event;
a filter unit that
receives notification of the specific event from the determination unit,
extracts features from the video data,
searches normal event information for identifying normal events using the features,
determines that there is a known specific event that corresponds to the normal events with a first type, and removes a normal event from the events that has been determined by the determination unit to correspond to the specific events,
determines that the known specific event corresponds to the normal events without the first type, executes recognition processing on the video data, and
on a condition that the recognition processing results in a match, removes the normal event and on a condition that the recognition processing results is not a match, sends a warning; and
an output unit that outputs information indicating that an event is occurring after the normal event was removed by the filter unit or outputs the warning.

2. The event analysis system according to claim 1, further comprising:
a learning unit that learns, by machine learning, an ordinary track of an object as the determination information based on the video data acquired by the camera.

3. The event analysis system according to claim 1, wherein
the output unit outputs information indicating an event removed by the filter unit.

4. An event analysis system comprising:
an estimation unit that estimates a track of a person based on video data acquired by a camera;
a determination unit that determines, based on determination information for determining a specific event, whether or not the track estimated by the estimation unit corresponds to a specific event;
an area estimation unit that specifies, based on tracks of a plurality of people estimated by the estimation unit, a point where a movement of each of the plurality of people is changed, and based on the specified point, estimates an area where the specific event has occurred in a capturing range of the camera; and
an output unit that outputs information indicating the area estimated by the area estimation unit, and
wherein the area estimation unit estimates, based on the tracks of the plurality of people estimated by the estimation unit from the video data of each of a plurality of adjacent cameras, an area where the specific event has occurred outside the capturing range of the plurality of cameras.

5. The event analysis system according to claim 4, wherein,
the output unit outputs information indicating the area estimated by the area estimation unit.

6. The event analysis system according to claim 5, wherein
the area estimation unit calculates a start point of the track of the person in the capturing range of each of the plurality of cameras based on location information indicating locations where the plurality of cameras are installed, and estimates an area where the specific event is occurring based on the calculated start point.

7. The event analysis system according to claim 5, further comprising:
a camera connection learning unit that specifies a plurality of video data containing a predetermined moving object in the video data acquired by each of the plurality of cameras, and learns adjacent cameras with the plurality of cameras for which the specified plurality of video data is acquired.

8. An event analysis method comprising:
estimating, by an estimation unit, a track of a person based on video data acquired by a camera;
determining, by a determination unit, based on determination information for determining a specific event, whether or not the track estimated by the estimation unit corresponds to the specific event;
receiving, by a filter unit, notification of the specific event from the determination unit;
extracting features from the video data;
searching normal event information for identifying normal events using the features;
determining that there is a known specific event that corresponds to the normal events with a first type, and removes a normal event from the events that have been determined by the determination unit to correspond to the specific events
determining that the known specific event corresponds to the normal events without the first type, executes recognition processing on the video data, and
on a condition that the recognition processing results in a match, removing the normal event and on a condition that the recognition processing results is not a match, sends a warning; and
outputting, by an output unit, information indicating that an event is occurring after the normal event has been removed by the filter unit or outputs the warning.

* * * * *